US011667587B2

(12) United States Patent
Shirley, Jr. et al.

(10) Patent No.: US 11,667,587 B2
(45) Date of Patent: Jun. 6, 2023

(54) POULTRY LITTER-BASED FERTILIZER AND A METHOD FOR MAKING THE POULTRY LITTER-BASED FERTILIZER FROM POULTRY LITTER

(71) Applicant: PREMIERE FERTILIZER SYSTEMS, LLC, Red Bay, AL (US)

(72) Inventors: Arthur R. Shirley, Jr., Florence, AL (US); Melissa C. Hayes, Florence, AL (US)

(73) Assignee: PREMIERE FERTILIZER SYSTEMS, LLC, Red Bay, AL (US)

( * ) Notice: Subject to any disclaimer, the term of this patent is extended or adjusted under 35 U.S.C. 154(b) by 54 days.

(21) Appl. No.: 16/911,575

(22) Filed: Jun. 25, 2020

(65) Prior Publication Data

US 2020/0331818 A1    Oct. 22, 2020

Related U.S. Application Data

(63) Continuation of application No. 16/778,046, filed on Jan. 31, 2020, now Pat. No. 10,723,665.

(Continued)

(51) Int. Cl.
*C05F 3/00* (2006.01)
*C05C 3/00* (2006.01)
(Continued)

(52) U.S. Cl.
CPC .................. *C05F 3/00* (2013.01); *C05B 9/00* (2013.01); *C05C 3/005* (2013.01); *C05D 1/00* (2013.01); *C05D 9/02* (2013.01); *C05G 1/00* (2013.01)

(58) Field of Classification Search
CPC ..... C05F 3/00; C05B 9/00; C05B 7/00; C05B 13/00; C05C 3/005; C05C 1/00;
(Continued)

(56) References Cited

U.S. PATENT DOCUMENTS 4,082,859 A ‡ 4/1978 Katzen ................... A23K 10/32
  426/63
4,125,465 A ‡ 11/1978 Turovsky .................. C02F 1/52
  210/71

(Continued)

FOREIGN PATENT DOCUMENTS

CA       1214062     ‡   11/1986
CA       1218517     ‡    3/1987

(Continued)

OTHER PUBLICATIONS

Jay Daniel and K.C. Olson. "Feeding Poultry Litter to Beef Cattle". MU Guide. MU Extension, University of Missouri Oct. 2005 <https://extension.missouri.edu/publications/g2077> (Year: 2005).*

(Continued)

*Primary Examiner* — Jennifer A Smith
(74) *Attorney, Agent, or Firm* — Jeffrey S. Melcher; Melcher Patent Law PLLC

(57) ABSTRACT

A method for producing a poultry litter-based fertilizer by a) supplying poultry litter to a rotating rotary drum, b) adding acid or a source of acid to the rotating rotary drum, wherein acid reacts with the poultry litter to form an acidified mixture, c) adding ammonia or a source of ammonia to the rotating rotary drum, d) drying and cooling the ammoniated product by evaporation of water to form a dried, cooled product in a free-flowing semi-solid or solid form, repeating the steps b) through d) until a desired nitrogen content is reached in the poultry litter-based fertilizer.

28 Claims, 13 Drawing Sheets

Related U.S. Application Data

(60) Provisional application No. 62/807,924, filed on Feb. 20, 2019.

(51) Int. Cl.
  *C05G 1/00* (2006.01)
  *C05B 9/00* (2006.01)
  *C05D 1/00* (2006.01)
  *C05D 9/02* (2006.01)

(58) Field of Classification Search
  CPC .... C05C 3/00; C05D 1/00; C05D 9/02; C05G 1/00; Y02A 40/20; Y02P 20/145
  See application file for complete search history.

(56) References Cited

U.S. PATENT DOCUMENTS

| | | | | |
|---|---|---|---|---|
| 4,369,199 | A ‡ | 1/1983 | Katzen | A01K 1/0152 426/64 |
| 4,650,682 | A ‡ | 3/1987 | Shirley, Jr. | B01J 8/10 422/20 |
| 4,902,431 | A ‡ | 2/1990 | Nicholson | C02F 1/02 405/12 |
| 5,135,664 | A ‡ | 8/1992 | Burnham | C02F 1/586 210/76 |
| 5,188,673 | A ‡ | 2/1993 | Clausen | C13K 1/02 127/1 |
| 5,275,733 | A ‡ | 1/1994 | Burnham | C02F 1/586 210/60 |
| 5,282,879 | A ‡ | 2/1994 | Baccarani | C05F 3/00 71/10 |
| 5,417,861 | A ‡ | 5/1995 | Burnham | C05F 17/40 210/60 |
| 5,853,450 | A ‡ | 12/1998 | Burnham | C05F 17/00 71/9 |
| 5,853,590 | A ‡ | 12/1998 | Burnham | C02F 11/18 210/60 |
| 5,984,992 | A ‡ | 11/1999 | Greer | C05D 9/02 71/11 |
| 6,159,263 | A ‡ | 12/2000 | Greer | C05F 3/00 71/11 |
| 6,406,510 | B1 ‡ | 6/2002 | Burnham | C05F 7/00 71/11 |
| RE38,238 | E ‡ | 8/2003 | Nicholson | C02F 1/02 405/12 |
| 6,758,879 | B2 ‡ | 7/2004 | Greer | C05G 5/12 71/11 |
| 6,841,515 | B2 ‡ | 1/2005 | Burnham | C05G 5/37 504/10 |
| 7,128,880 | B2 ‡ | 10/2006 | Dahms | C05F 7/00 422/12 |
| 7,169,204 | B2 ‡ | 1/2007 | Greer | C05F 3/00 71/11 |
| 7,513,927 | B2 ‡ | 4/2009 | Faulmann | C05D 3/02 71/11 |
| 7,534,281 | B2 ‡ | 5/2009 | Dahms | C05B 7/00 71/64 |
| 7,662,205 | B2 ‡ | 2/2010 | Burnham | C05C 3/00 71/11 |
| 7,662,206 | B2 ‡ | 2/2010 | Burnham | C05F 7/00 71/11 |
| 7,789,931 | B2 ‡ | 9/2010 | Burnham | C05C 3/00 71/11 |
| 7,947,104 | B2 ‡ | 5/2011 | Burnham | C05F 5/00 71/11 |
| 7,947,105 | B2 ‡ | 5/2011 | Burnham | C05G 3/20 71/11 |
| 8,057,569 | B2 ‡ | 11/2011 | Burnham | C05C 3/00 71/11 |
| 8,105,413 | B2 ‡ | 1/2012 | Burnham | C05B 7/00 71/12 |
| 8,192,519 | B2 ‡ | 6/2012 | Burnham | C05C 3/00 71/11 |
| 8,198,211 | B2 ‡ | 6/2012 | Johnson | B01J 20/28016 502/42 |
| 8,202,342 | B2 ‡ | 6/2012 | Burnham | C05C 7/00 71/11 |
| 8,470,065 | B1 ‡ | 6/2013 | Burnham | C05G 5/30 71/11 |
| 8,491,693 | B2 ‡ | 7/2013 | Burnham | C05F 9/00 71/11 |
| 8,557,013 | B2 ‡ | 10/2013 | Burnham | C05G 1/00 71/11 |
| 8,597,394 | B2 ‡ | 12/2013 | Burnham | C05C 11/00 71/11 |
| 8,814,976 | B2 ‡ | 8/2014 | Pedersen | C05D 9/00 71/31 |
| 8,864,868 | B2 ‡ | 10/2014 | Burnham | C02F 11/14 71/11 |
| 8,920,733 | B2 ‡ | 12/2014 | Burnham | C05B 17/00 422/11 |
| 8,992,654 | B2 ‡ | 3/2015 | Dahms | C05D 3/00 71/11 |
| 9,114,358 | B2 ‡ | 8/2015 | Johnson | B01J 20/3021 |
| 9,233,882 | B2 ‡ | 1/2016 | Burnham | C05B 17/00 |
| 9,328,030 | B2 ‡ | 5/2016 | Burnham | C05D 9/02 |
| 9,586,869 | B1 ‡ | 3/2017 | Burnham | C05G 1/00 |
| 9,695,092 | B2 ‡ | 7/2017 | Burnham | C05F 7/00 |
| 9,856,178 | B2 * | 1/2018 | Burnham | C05C 3/005 |
| 2006/0024281 | A1 ‡ | 2/2006 | Cheung | C05F 3/00 424/93 |
| 2015/0191399 | A1 ‡ | 7/2015 | Dahms | C05C 3/00 71/12 |
| 2015/0197458 | A1 ‡ | 7/2015 | Thomsen | C05F 3/06 71/21 |
| 2016/0137560 | A1 ‡ | 5/2016 | Burnham | C05C 3/00 71/13 |
| 2018/0105474 | A1 ‡ | 4/2018 | Burnham | C05C 3/005 |

FOREIGN PATENT DOCUMENTS

| | | | | |
|---|---|---|---|---|
| WO | WO-8403204 A1 * | 8/1984 | | A23K 50/15 |
| WO | WO-WO-8403204 A1 ‡ | 8/1984 | | A23K 10/26 |
| WO | 2014/025275 | 2/2014 | | |
| WO | WO-2014/025275 ‡ | 2/2014 | | |

OTHER PUBLICATIONS

CM Sullivan, CG Cogger, and AI Bary, "Fertilizing with Biosolids", Pacific Northwest Extension Publication, Feb. 2015, PNW 508.‡
Written Opinion and International Search Report issued in corresponding PCT/US20/16960, dated May 7, 2020, pp. 1-20.‡
Office Action issued in corresponding Chili patent application No. 2021-002181, dated Oct. 18, 2022, pp. 1-18.
Extended European Search Report issued in corresponding EP application No. 20758870.8, dated Dec. 12, 2022, pp. 1-9.

\* cited by examiner
‡ imported from a related application

CROSS-SECTIONAL END VIEW OF THE INLET END

FIG. 10 CROSS-SECTIONAL VIEW OF ACIDIFYING ZONES 1 AND 4

POULTRY LITTER-BASED FERTILIZER AND A METHOD FOR MAKING THE POULTRY LITTER-BASED FERTILIZER FROM POULTRY LITTER

FIELD OF THE INVENTION

The present invention relates to a new and improved poultry litter-based fertilizer and method for the conversion of poultry litter into a valuable poultry litter-based fertilizer containing enhanced levels of nitrogen, sulfur, secondary nutrients, and micronutrients, an elevated nitrogen to phosphorus ratio, and organic carbon to improve soil health. The process to produce the poultry litter-based fertilizer is environmentally friendly in that it does not require added heat from burning fossil fuels, produces clean air emissions, and does not release significant quantities of carbon dioxide or other greenhouse gases. Off-gases and dust as well as any waste streams from the process are recycled back into the process. The only main discharges from the methods are water vapor and the poultry litter-based fertilizer product.

BACKGROUND OF THE INVENTION

Many million tons of poultry litter are produced annually in the United States virtually all from intensive systems. Poultry litter is solid waste material composed primarily of bedding material (any of a variety of lignocellulose materials), feathers, spilled animal feed, and poultry excreta, the litter having been removed from poultry houses. The relative proportion of bedding to excreta can vary widely, as can the chemical nature of the litter. There also may be pathogens, weed seed, and drug contaminants present in the litter. Litter is, of course, malodorous due to various odorants or precursors thereof. In addition to free ammonia there have been identified odorants such as mercaptans, sulfides, di-ketones, indole, and skatole. Litter contains and during storage and composting generates many volatile organic compounds (VOCs).

Poultry litter is recognized as a serious source of nitrification of waters. As poultry production steadily grows due to demand for poultry products and population growth; so does the waste from this production. Efforts to protect our environment have led to regulations causing local producer/farmers to struggle with meeting state mandated nutrient management program requirements while remaining solvent with narrow profit margins.

Currently, the U.S. alone generates 13 million tons of poultry litter each year. The growing population consuming more poultry also needs an increasing food supply from crops which require fertilizer. Poultry litter is used as fertilizer due to its well-documented source of primary plant nutrients (nitrogen, phosphorus, and potassium), secondary nutrients (sulfur, magnesium, and calcium), and micronutrients like zinc, copper, iron, boron, nickel, manganese, and molybdenum. However, using poultry litter as a fertilizer in either its raw form or after traditional treatments like composting or rotary drum heat treatment is not nutrient efficient, energy efficient, or safe to our health or environment. Also, even litter that has been heat treated will give off offensive odors when exposed to moisture or rain. Additionally, litter haulers are faced with a growing supply of poultry litter and a narrowing availability for land application. This leads to stockpiles of litter that further cause problems from release of greenhouse gases, potential leaching and run-off, human and animal exposure to pathogens, and loss of nutrients in the litter.

Animal production concentrated in small regions has led to litter disposal problems causing growing health and environmental issues, both internationally and in the U.S. According to the USDA ERS, 69% of the broilers produced in the U.S. were produced in the southern states of Georgia, Arkansas, Alabama, Mississippi, North Carolina, Texas, and Kentucky. Currently, poultry litter management regulations require poultry producers to create nutrient management plans that include safe disposal and use of their litter waste. These regulations put a considerable burden of management on the shoulders of local farmers who already face tough profit margins. Currently, most poultry litter is applied to fields. However, this use of litter is inefficient, bad for the environment, and a threat to human health. Furthermore, farmers face regulations on land application that restrict when litter can be applied. The concentration of litter production to certain regions combined with the regulations on land application have created an excess of litter with no place to apply it. This leads to a need for safe uses of the litter, especially in times when land application is controlled or banned.

One way that poultry litter is a threat to our environment is in land applying it in raw form. This practice has been shown to lead to runoff to waterways and leaching to groundwater leading to nitrification of waterways. This is especially true when phosphorus builds up in the soil due to repeated applications of poultry litter. The leaching of phosphate from the soil is a serious problem in major waterways such as is seen currently in the Chesapeake Bay.

Poultry litter is typically 3-3-3 (% N-% $P_2O_5$-% $K_2O$), on average typically contains 20-30% moisture and 25-35% organic carbon. Since plants have a much higher need for nitrogen than for phosphorus, litter is added at higher levels than the plants are able to take up phosphorus. As a result, with repeated applications of litter, phosphorus builds up in the soil which has led to regulations now in place to limit the land application of litter in areas with high phosphorus or areas close to waterways.

Poultry producers often use lime to control disease in their poultry houses. As a result, litter from these producers may be high in calcium. When this litter is applied, calcium levels in the soil increases as well as the soil pH. Over time, this inhibits the uptake of other nutrients such as magnesium and zinc.

Poultry litter poses human health problems in various ways. Untreated litter dust not only smells bad but also carries pathogens in the air that can be dangerous to humans. These pathogens also have potential to be transmitted to livestock feeding on grass in fields treated with litter as well as to vegetables and other crops grown with litter used as fertilizer. Typical methods of mitigating this problem include composting or stacking the litter. These methods allow heat to kill the pathogens before applying. However, pathogens may persist due to uneven heating during the process and not only survive but become even more virulent than prior to the treatment. Food can then be contaminated when grown with the treated litter.

Another health concern of using litter is the existence of drugs and hormones in the litter. The presence of antibiotics in our environment as well as other drugs has become an increasing concern to human health. Not only can these enter the water supply; but in the case of antibiotics, they can increase the virulence of bacteria in our environment.

Composting and stacking litter has an additional negative effect on our environment which is the release gases and reduced air quality. As stated above, pathogens can be transmitted to air by poultry litter. Composting litter also causes losses of both nitrogen and phosphorus due to denitrification and ammonia volatilization, run-off, and leaching. These losses can be quite high.

Another method of treating poultry litter to create a product for fertilizer is rotary drum drying. This uses heat to kill harmful organisms and heats the product more evenly. However, it requires the use of fossil fuels, is inefficient, and suffers from nutrient loss, in particular nitrogen, as well as the generation of greenhouse gases. Also, when the litter encounters moisture; offensive odors are generated.

Canadian Patent No. 1214062 (Anthony, Smith, and Shirley) discloses a process of producing fertilizer from poultry litter, the complete disclosure of which is incorporated herein by reference. However, this process is limited in the amount of nitrogen in the final fertilizer product. The present invention is a substantial and surprising improvement over this patent.

U.S. Pat. No. 4,650,682 (Shirley, Jr.) illustrates a preferred type of acidifier-ammoniator vessel that can be modified as described herein for use in the present process. The complete disclosure of this patent is incorporated herein by reference.

There is a great need for a clean, non-polluting, poultry litter-based fertilizer that is free of offensive odors and has an increased level of nitrogen. Such a clean poultry litter-based fertilizer would provide benefits to plants due to its nutrient content as well as its ability to improve soil health. Arable land is decreasing and one of the causes of loss of arable land is a depletion in organic carbon. Poultry litter contains organic carbon; and when this litter is land applied, leads to an increase in soil carbon that improves the water holding capacity of soil. Using a clean poultry litter-based fertilizer on land would help to reverse damage from long term cultivation by improving formation of soil aggregates which improves water and oxygen diffusion rates.

Poultry litter is typically comprised of 30% bedding material and 70% excreta. As a result, the litter is a complex mixture of many compounds including sugars, fatty acids, cellulose, lignin and extractives, vitamins, and amino acids. Poultry litter naturally contains all of the nutrients, secondary nutrients, and micronutrients needed by plants including N, P, K, S, Zn, Ca, Mg, Mn, B, and Cu. The nutrient content of litter depends on many factors including management practices, the type of bedding material used, feeds, and more. Typically, on a dry basis poultry litter contains 1%-4% N, 25%-35% carbon, 1.4%-7.5% $P_2O_5$, 1.3%-4.1% $K_2O$ and 0.3% to 2% S. Poultry litter also contains high levels of lignocellulose due to the bedding materials used in poultry houses. The bedding materials used are readily available forest and agricultural wastes such as straw, wood chips, peanut hulls, and rice hulls, for example. Poultry litter differs significantly from other wastes used to produce fertilizer. Poultry litter contains a multiplicity of organic compounds in addition to lignocellulose and these differ from organic compounds in manures, sewage, and biosolids.

It is well known that ammonium nitrate is explosive. According to the United States Department of Homeland Security, the minimum detonable level of ammonium nitrate is 10% (DHS Ammonium Nitrate Security Program, Vol. 84 No. 106, Fed. Reg. 25495, Jun. 3, 2019).

SUMMARY OF INVENTION

The present invention converts poultry litter to a valuable dry, homogenous balanced granular or pelletized fertilizer free of noxious odors, free of harmful pathogens and viruses, free of viable weed seeds, and free of drugs, steroids, and pesticides. The process to convert poultry litter to fertilizer uses only a rotary drum. No dryer using an outside source of fuel such as fossils fuels or burning of organic matter is required such as is required in Canadian Patent No. 1214062 (Anthony, Smith, and Shirley). This process is accomplished by repeatedly treating the poultry litter with a strong acid acidifying step followed by a partial neutralizing and ammoniating step with carefully controlled addition of water, followed by an evaporative drying and cooling step. The drying and cooling step can be accomplished while controlling temperature and removing moisture volatilized utilizing the heat generated by the acidifying and the ammoniating steps to thereby convert the poultry litter to a dry free flowing granular fertilizer product or to a pelletized fertilizer product. The ability to produce a dry granular fertilizer product with elevated nitrogen using the heat of the process is a surprising and significant improvement over previous processes to convert poultry litter to fertilizer or animal feed.

Surprisingly, by adding water during the process; the invention unexpectedly allows for the production of a granular product with significantly more nitrogen than would be expected. This addition of water is counterintuitive for producing a dry product but necessary in order to cool the product and to react acid in the interior of the granule with base applied after acidifying the litter. In a rotary drum process that produces granular ammonium sulfate, ammonium sulfate crystallizes on the surface of the material as ammonia and acid react. Ammonium sulfate crystallizing on the surface of the material as it is being made prevents the reaction of ammonia with acid in the interior of the material. The present invention surprisingly overcomes this problem by strategically adding water just before and/or during addition of ammonia to keep the ammonium sulfate solubilized on the surface of the granule. The addition of water dissolves ammonium sulfate formed on the surface of the granule and allows the penetration of ammonia into the granule to react with sulfuric acid which is otherwise trapped beneath a layer of crystallized ammonium sulfate. This novel solution solves a major unexpected problem and results in a dramatic increase in nitrogen content of the fertilizer. As a result, the formation of ammonium sulfate is throughout the whole granule which allows the reaction of significantly more ammonia with acid resulting in a granular product with higher nitrogen levels and less free acid. By adding an evaporative drying and its accompanying cooling step in the rotary drum after ammoniating and then repeating acidifying and then ammoniating while adding water, the nitrogen level of the product can be increased further. Without the evaporative drying and cooling step, the process reaction temperature could not be controlled and would result undesirable clumping of the material and prevent production of a granular product of the controlled desired size.

Due to the high levels of heat generated by dilution of concentrated acid and the reaction of the acid with ammonia, the final product is a dry granule without the use of fossil fuels or the burning of organic materials to dry the product. By carefully controlling the addition of water to the process and by using an evaporative drying and cooling step; the final product contains a desired target moisture level and is a 1 mm to 3 mm granule. This size range of granules is an ideal size for agricultural fertilizer, golf courses, and lawns.

The present invention provides unexpected and surprising advantages over the prior poultry litter-based fertilizer methods. The present poultry litter-based fertilizer product contains significantly higher levels of nitrogen than typically contained in poultry litter; and the ratio of nitrogen to phosphorus is significantly increased, thereby dramatically reducing the land application of phosphorus and thus pollution runoff of phosphorus into waterways, bays, and gulfs is also radically reduced. In addition to the increase in nitrogen, the sulfur levels are also significantly increased. The final fertilizer product no longer produces an offensive odor even if it is exposed to moisture since the compounds causing the odor are altered by the present process.

The nitrogen in the present poultry litter-based fertilizer product can be a combination of slow release and quick release and includes nitrogen present in the starting litter. If desired, micronutrients in the final product are enhanced by the process to levels to meet plant requirements and to allow uptake by plants. The fertilizer also contains organic carbon to improve soil health. By adjusting the pH and heat; pathogens, viruses, weed seeds, drugs, hormones, steroids, and antibiotics are destroyed. All of this can be accomplished without burning fossil fuels to heat the material or to dry the material and all waste streams are recycled back into the process. Thus, only water vapor and the final fertilizer product are expelled from the process.

During the processing of the poultry litter, nitrogen content of the excreta component of the litter is stabilized by converting volatile or potentially volatile nitrogen compounds in the excreta to a non-volatile form. This stabilizes the nitrogen compounds so that nitrogen in the starting poultry litter is retained in the product rather than volatilizing and the nitrogen compounds do not produce odor even if the product is exposed to moisture. In the process, the reaction conditions in the steps are selected and controlled so that heat generated by the chemical reactions (heat of dilution of acid, heat of reaction of acid with the litter, and subsequent heat of reaction of ammonia with acidified litter) raises the temperature and reduces the pH to levels at which the pathogens, drug contaminants, and weed seeds are destroyed or rendered non-toxic. The acidifying step reaches such a low pH that bonds in organic compounds are reacted changing the chemical makeup of the litter and destroying viruses, pathogens, drugs, steroids, VOCs, and other compounds present. These reactions are not reversible and thus the organic compounds remain in their changed form as new chemicals.

The material enters an evaporative drying and cooling step in the process during which the product is cooled and water is removed. This evaporative drying and cooling step must occur before repeating the acidifying and ammoniating steps to keep the material free-flowing since the ammonium salts produced are soluble in water. The process results in a dry or essentially dry product without direct input of heat.

In one embodiment of the invention, the litter enters a Reactor-Evaporator Drum disclosed in U.S. Pat. No. 4,650,682 (Shirley, Jr.), and has been modified to comprise multiple zones as shown in FIG. 7, where the first step is an acidifying step using an acid or a combination of acids chosen from the group comprising sulfuric acid ($H_2SO_4$), sulfurous acid ($H_2SO_3$), nitric acid ($HNO_3$), nitrous acid ($HNO_2$), phosphoric acid ($H_3PO_4$), phosphorous acid ($H_3PO_3$), hypophosphorus acid ($H_3PO_2$), pyrophosphoric acid $H_4P_2O_7$, triphosphoric acid ($H_5P_3O_{10}$), trimetaphosphoric acid ($H_3P_3O_9$), and hypophosphoric acid ($H_4P_2O_6$), boric acid, organic acids like acetic acid, citric acid for example, and other acids. Preferably, the acid or source of acid used is a strong acid or forms a strong acid, such as 93-98% sulfuric acid and/or oleum, more preferably 98% sulfuric acid or oleum. When nitric acid or nitrous acid are used, they are used at levels to keep the resulting ammonium nitrate level in the product at less than 10% to keep it below the minimum detonable level. Thereafter the ammoniating step uses ammonia to react with the acid and/or acids and produces an ammonium salt or ammonium salts and heat. Just before and/or during the ammoniating step, water is added to the material to solubilize the ammonium sulfate as it forms on the surface of the material and allow the ammonia to react with the sulfuric acid in the material. Next, the material enters an evaporative drying and cooling step during which heat is removed by the evaporation of water in the material. The acidifying, ammoniating with water, and drying and cooling steps are repeated sequentially to further increase the nitrogen in the material and then the material enters a final evaporative drying and cooling step to remove moisture and heat. The drying of the material is accomplished without the use of an expensive dryer supplied with heat by burning litter, burning fossil fuels, or using other heat sources from outside of the rotary drum process.

During the final evaporative drying and cooling step, wash down water can be sprayed to further cool the material and/or a waste streams can be sprayed to further cool the material and recycle the waste stream. If necessary, additional water is sprayed to further cool the material. This results in a dry or essentially dry product without direct input of heat.

During the process, in particular during the acidification step, the material agglomerates into granular particles on being sprayed with acid while moving in the fastest portion of the rolling bed in the rotary drum. During this spraying, physical attraction between small particles and acid is at a level that allows the formation of granules. As shown in the examples, it is important to spray and not stream the acid in order to control the granule size.

In a preferred embodiment of the invention, granular fertilizer is produced in a rotary drum. Agglomeration occurs in the acidifying step. Water is added before and/or during the ammoniating step to dissolve ammonium sulfate as it forms, to cool the product by evaporation of water, and to capture and distribute the ammonia that is sparged into the rolling bed of solid material so that the reaction between ammonia and sulfuric acid occurs throughout the whole granule. Without the addition of water, the reaction occurs only on the surface of the granule and the center of the granule contains concentrated sulfuric acid.

To elevate nitrogen levels to desired levels, the evaporative drying and cooling step is necessary to keep the material free flowing in a solid or semi-solid form. This is due to the fact that acids react with ammonia to produce ammonium salts such as ammonium sulfate, and these ammonium salts are very soluble in water. The pre-processed poultry litter fed to the process can contain large amounts of water, for example 20-40 wt. %, and this water dissolves the ammonium salt as it is being produced. To maintain the material as a free-flowing semi-solid or solid, the resulting ammonium salt solution must be managed and the water evaporated before more ammonium salt can be produced. Hence, water is carefully added during the ammoniation step to form granules, to maintain free flow and at the same time to keep the ammonium salt from crystallizing on the surface during the reaction of ammonia with acid as the granule is formed so that high levels of unreacted acid do not get trapped beneath the surface of the granule.

In a preferred embodiment of the invention, the material enters the Reactor-Evaporator Drum where the acidifying step utilizes oleum (sulfur trioxide dissolved in sulfuric acid) or a combination of oleum with other acids or sulfur trioxide gas injected into the bed in the same manner as the ammonia is injected in the ammoniating step. During this acidifying step, the sulfur trioxide reacts with water in the poultry litter to form sulfuric acid. The reaction of sulfur trioxide with water means that less water must be vaporized by the heat of dilution and heat of reaction and therefore allows the addition of more water from other sources such as wash down water or alternatively the use of higher levels of other acids with lower heats of reaction. The resulting product has a higher nitrogen to phosphorus ratio but a lower sulfur to nitrogen ratio than produced by using acids only. For this embodiment of the invention, after the acidifying step; either ammonia as well as water and/or ammonium hydroxide is used for the ammoniating step to produce an ammonium salt and heat. Next, the material enters an evaporative cooling step during which heat is removed by the evaporation of water in the material utilizing the heats of reaction. If necessary, water is sprayed to further cool the material by evaporation. The acidifying and ammoniating steps are repeated sequentially to further increase the nitrogen in the material to a desired level and then the material enters a final evaporative cooling step to remove moisture and heat.

In another embodiment of the invention, the material enters a Reactor-Evaporator Drum where the acidifying step uses sulfuric acid or a combination of sulfuric acid with other acids and sulfur trioxide added into the bed of litter in the drum. During this acidifying step, the sulfur trioxide reacts with water in the poultry litter to form sulfuric acid. After the acidifying step, either ammonia and water and/or a source of ammonia, such as, ammonium hydroxide is used for the ammoniating step to produce ammonium salt or ammonium salts and heat. Next, the material enters an evaporative drying and cooling step during which heat and water are removed by the evaporation of water in the material. If necessary, water is sprayed to further cool the material. The acidifying and ammoniating steps are repeated sequentially to further increase the nitrogen in the material to a desired level, and then the material enters a final evaporative cooling step to remove moisture and heat.

Sulfuric acid and/or oleum and sulfur trioxide partially carbonize the poultry litter and/or convert the lignocellulose to sugars, and convert the lignocellulose to forms of carbon more readily available to soil organisms and plants.

In another embodiment of the invention, secondary nutrients and/or micronutrients are enhanced in the fertilizer product by adding to the acidifying section of the Reactor-Evaporator Drum one or more metals chosen from the group zinc, iron, copper, magnesium, manganese, nickel, and more; and/or metal oxides chosen from the group zinc oxide (ZnO), magnesium oxide (MgO), manganese oxides (MnO, $Mn_3O_4$, $Mn_2O_3$, $Mn_3O_4$, $MnO_2$, $MnO_3$, $Mn_2O_7$), and copper oxides ($Cu_2O$, CuO, $CuO_2$, $Cu_2O_3$), iron oxides (FeO, $FeO_2$ and others), nickel oxide (NiO or $Ni_2O_3$), and others; and/or a combination of metals and/or metal oxides. These metals and/or metal oxides react during the acidifying step to produce soluble salts such as sulfates for example that provide secondary and micronutrients in a plant-available form. In some cases, it may be desirable to add select nutrients, secondary nutrients, and/or micronutrients as salts by choosing one or more from the group lime, magnesium chloride, magnesium nitrate, sodium nitrate, sodium chloride, zinc chloride, zinc nitrate, copper chloride, copper nitrate, potassium chloride, potassium nitrate, potassium sulfate, triple super phosphate, super phosphate, and others. When a nitrate salt is used, the nitrate salt may react to produce a metal sulfate and ammonium nitrate. Therefore, the level of nitrate salt used is such that the resulting ammonium nitrate is less than 10% by weight of the product in order to keep the ammonium nitrate below the minimum detonable level.

In another embodiment of the invention, nutrients, secondary nutrients and/or micronutrients are enhanced in the fertilizer product by adding to the ammoniating section or sections of the Reactor-Evaporator Drum ammonia and water and/or ammonium hydroxide in combination with other bases chosen from the group potassium hydroxide, zinc hydroxide, magnesium hydroxide, manganese hydroxide, and other bases with elements beneficial to plants.

Phosphorus may be enhanced in the fertilizer product produced by the process by adding ground phosphate rock or phosphoric acid in the acidifying step and/or ammoniating step.

The current invention, converts poultry litter to a poultry litter-based fertilizer that contains % N levels greater than 6%, more preferably greater than 8%, and most preferably greater than 10%; with % $P_2O_5$ levels of less than 3%, more preferably less than 2%, and most preferably less than 1.5%; with % $K_2O$ of preferably more than 1%, more preferably greater than 2% and most preferably greater than 3% which is adjusted by adding potassium hydroxide, potassium chloride, and/or potassium sulfate, and/or other potassium source; and with % S levels of greater than 2%, more preferably greater than 5% and most preferably greater than 7%. In reference to this document, all percentages are in concentrations found as the percent by weight of the component compared to the total weight of the material.

The starting poultry litter used in the present invention is a solid material typically with 20%-30% water such that heats of reaction will be capable of driving off water without the use of fossil fuels. On a dry basis, the poultry litter is comprised of at least 2.5% nitrogen, and preferably at least 3.5% nitrogen; at least 3% $P_2O_5$; at least 2.5% $K_2O$, at least 1% sulfur; and at least 3.5% other secondary nutrients and micronutrients.

Micronutrients occur naturally in poultry litter but can be enhanced as needed using the inventive process which further provides micronutrients in plant-available soluble form. The resulting poultry litter-based fertilizer is a homogenous granular fertilizer in a free-flowing semi-solid or solid form. The fertilizer's homogeneity allows the micronutrients to be applied uniformly over the field at low levels. Homogeneity of macronutrients is not easily achievable when applying micronutrients individually as granular material or as part of a blended fertilizer. The present invention solves this problem by blending in any added micronutrients during the process of producing the poultry litter-based fertilizer.

At least 10% of the inventive fertilizer product is comprised of compounds from the original poultry litter, preferably at least 20% and more preferably at least 30% of the inventive product is comprised of compounds from the original organic materials measured on a dry basis. The organic carbon content of the poultry litter can still be present in the product after the inventive process. This organic carbon in the product is preferably up to 35 wt % and more preferably 10 wt % to 30 wt % of the final poultry litter-based fertilizer. The starting nitrogen and other nutrients in the poultry litter is fully contained in the inventive fertilizer product.

For the process to control emissions and to produce enough heat to evaporate water without using external heat sources for drying, up to 55% of the product can be from the starting litter. If desired, more than 55% of starting litter can be in the final product and an outside heat source used for drying the product. With these higher levels of starting litter in the product, the emissions will be only water vapor and the combustion products of the heat source.

All embodiments of the invention provide a process for treating raw poultry litter in dry, particulate, free-flowing form comprising forming a stream of the free-flowing litter particles; spraying the stream with atomized acid or acid gas or adding the acid in an amount to reduce the pH of the particles to a level of less than 2.5, and preferably less than 2.0, and most preferably less than 1.0 in the first acid reaction step; which destroys drugs, pathogens, viruses, steroids, hormones, and VOCs. The acid is added at a rate that maintains the acidified particles as free-flowing or as flowing agglomerated particles and forming a tumbling bed of the acidified particles or agglomerates; introducing anhydrous ammonia or aqueous ammonia into the acidified particles from at least one location within the bed to increase the pH of the particles to enhance the nitrogen content and to thereby generate heat and increase the temperature of the particles to vaporize moisture, and to further reduce and destroy any residual pathogen content, render weed seeds non-viable, and destroy drugs; utilizing the heats of reaction and dilution and evaporative cooling to maintain a free-flowing material by removing moisture and heat from the process before repeating the acidifying and ammoniating steps.

In one embodiment of the invention, during the acidification step the acidified material comprises preferably less than 35 wt. % water and more preferably less than 30%.

In the drying and cooling step, the ammoniated material is dried by evaporation of water to a moisture content where the dried, cooled product is a free-flowing semi-solid or solid. The moisture content of the material at the end of the drying and cooling step is preferably less than 20 wt. %, more preferably less than 15 wt. %, more preferably less than 10 wt. %, and most preferably less than 5 wt. %.

The present invention can utilize the heat of reaction from sulfuric acid as it dissociates in water (heat of dilution) according to equation (1). This water is present in the starting poultry litter as well as added during the process, especially in the ammoniating step.

$$H_2SO_4 \rightarrow 2H^+ + SO_4^- + heat \quad (1)$$

Additionally, in the present invention sulfuric acid reacts with ammonia to produce ammonium sulfate through an exothermic reaction (see equation 2). Ammonium sulfate is very soluble in water and it useful as a fertilizer due to both its nitrogen and its sulfur content.

$$H_2SO_4 + 2NH_3 \rightarrow (NH_4)_2SO_4 + heat \quad (2)$$

The present invention can further utilize the heat of reaction when acids react with bases to produce salts and water. One such reaction is the reaction of sulfuric acid with ammonium hydroxide (aqueous ammonia) to produce ammonium sulfate as shown in equation (3).

$$H_2SO_4 + 2NH_4OH \rightarrow (NH_4)_2SO_4 + 2H_2O + heat \quad (3)$$

Other acid-ammonia reactions are useful in producing fertilizer according to the present invention and are exothermic, such as equations (4) for example.

$$H_3PO_4 + 3NH_3 \rightarrow (NH_4)_3PO_4 + heat \quad (4)$$

Metals in general react with acids to produce metal salts and hydrogen. Specifically, metals can react with sulfuric acid to produce metal sulfates and hydrogen gas as shown in equation 5 for example.

$$Zn + H_2SO_4 \rightarrow ZnSO_4 + H_2 \quad (5)$$

Metal oxides can also be used to produce metal sulfates according to equation (6) for example.

$$ZnO + H_2SO_4 \rightarrow ZnSO_4 + H_2O \quad (6)$$

Sulfuric acid is known to react with double bonds in organic compounds such as aromatics, alkenes, sugars, cellulose, and more and results in an organic compound bound to a hydrogen sulfate group as illustrated by one simple example reaction shown in Equation 7 below.

$$CH_2=CH_2 + H_2SO_4 \rightarrow CH_3-CH_2HSO_4 \quad (7)$$

Oleum, also called fuming sulfuric acid ($H_2SO_4 \cdot xSO_3$), is a solution of sulfur trioxide in sulfuric acid that is beneficial to soil organisms and that enhance plant growth. Sulfur trioxide reacts with water to form sulfuric acid according to equation (8).

$$SO_3 + H_2O \rightarrow H_2SO_4 + heat \quad (8)$$

Hence, oleum uses up water when it reacts as well as releases heat during the reaction. Furthermore, both sulfuric acid and oleum are known to hydrolyze lignocellulose to sugar. Sulfuric acid and oleum may dehydrate sugar to produce carbon. Oleum is an example of source of acid that can convert to acid in the vessel.

Rotary Drums having multiple zones can be constructed for use in the acidifying operation, ammoniating operation, and the evaporative cooling operation as the vessel, herein referred to as a Reactor-Evaporator Drum. The Reactor-Evaporator Drum preferably includes at least three separated chambers (also referred to as zones), which are separated by baffles, and the chambers are in communication with each other so that the materials can flow from one chamber to the next in a continuous manner to operate the entire process in a continuous manner. The rotary drum can include multiple zones, such as six in total as shown in the FIGS. 1A, 1B and 7. However, any desired number of zones can be utilized, such as 5, 8, and 9 zones may also be used, separated by baffles. Each zone is designed to optimize the process for that zone. The first zone of the six zone drum is the acidifying zone. In this zone, the acid and/or source of acid is added to the litter so that the material remains free flowing. The next zone is where the ammonia and/or source of ammonia is added so that the ammoniating takes place and is downstream from the acidifying zone. In the ammoniating zone, preferably anhydrous ammonia and water is added or ammonium hydroxide (a source of ammonia) which reacts with the acidified material produced in the first zone. In both the first and second zone, heat is generated so that the temperature of the material is increased preferably to greater than 65.6° C. (150° F.), more preferably greater than 82.2° C. (180° F.), more preferably greater than 90° C. (194° F.), and most preferably greater than 98.9° C. (210° F.).

Next is the evaporative cooling zone of the rotary Reactor-Evaporator Drum which uses lifting flights to lift the material and create falling material that falls through the cross-section of the evaporative cooling zone of the Reactor-Evaporator Drum. Thus, free-flowing means that semi-solid or solid particles of the material can remain separated from one another during the process so that the semi-solid or solid particles can fall during the process. This allows maximum contact of the material with air that can be continuously pulled or pushed through the zones of the Reactor-Evaporator Drum and thereby maximizes the heat and water removal from the material in the drum.

If necessary, water and/or wash water may be sprayed in the evaporative cooling zone. Wash water is water from washing down plant floors and equipment. Once the material has cooled to less than 80° C. (176° F.), more preferably to less than 76.7° C. (170° F.), more preferably to less than 71.1° C. (160° F.), and most preferably to less than 65.6° C. (150° F.); the material enters the next zone of the Reactor-Evaporator Drum which is another acidifying zone as described previously. Then the material passes to another ammoniating zone, and finally to the final evaporative drying and cooling zone both of which are as described previously. The poultry liter-based fertilizer leaving the drum preferably has a moisture content of less than 12%, more preferably less than 10%, and most preferably less than 8% water.

Alternatively, the Reactor-Evaporator drum may be modified to have nine zones with the first six as described above and the last three being an additional acidifier zone followed by an ammoniating zone followed by an evaporative cooling zone. As another alternative if desired, the Reactor-Evaporator may be designed with either five zones or eight zones eliminating the last evaporative cooling zone from the six zone or nine zone Reactor-Evaporator Drums respectively. In the case of the five zone and eight zone drums, the final evaporative cooling step when needed is performed in a separate drum, a fluid bed, or other drying and cooling technology known to those familiar in the art of drying and cooling material.

The Reactor-Evaporator Drum can be continually swept with air. These off-gases can be sent to a scrubber to be scrubbed with acid, preferably sulfuric acid. The drum, scrubber, and ductwork through which the moist air passes are insulated to reduce loss of heat to the surrounding environment and prevent water from condensing in the drum, ductwork, and scrubber. The scrubber solution can be recycled back into the process, for example added with the acid in the acidifying step. Wash down water can also added back into the process preferably prior to or with the acidifying step, and/or with the ammoniating step, and/or in the evaporative cooling step; most preferably in the second ammoniating step and/or evaporative cooling step. It is preferable not to add scrubber solution to the final evaporating step since this solution contains sulfuric acid and could produce a final product that is too acidic.

An alternative embodiment of the invention includes using two or more rotary drums each with three sequential zones: an acidifying zone followed by an ammoniating zone followed by an evaporative cooling zone.

Another embodiment of the process uses a drum with only three sequential zones: acidifying, ammoniating, and evaporative cooling; and then recycling a portion of the material back into the drum.

For all of the above embodiments, once the processed litter has reached the targeted % N of preferably more than 6%, more preferably more than 8%, and most preferably more than 10%; and the percent moisture is preferably less than 12%, more preferably less than 10%, and most preferably less than 8%; the material enters a pellet mill for compaction if desired and then is reduced in size in a crumbler if desired. If needed, the material exiting the drum is passed through a high pressure drop, low air flow fluid bed to cool the material further before sending it to a pellet mill for compaction. The heated air from this fluid bed is recycled back into Zone 1 of the rotary Reactor-Evaporator Drum.

In another embodiment, a Reactor-Evaporator Drum with five zones is used. However, any desired number of zones can be utilized, such as 7 zones may also be used, separated by baffles. Each zone is designed to optimize the process for that zone. The first zone of the five zone drum is the acidifying zone. In this zone, the acid and/or source of acid can be added to the litter so that the material remains free flowing. The second zone is where the ammonia and water and/or source of ammonia is added so that the ammoniating takes place and is downstream from the acidifying zone. In the ammoniating zone, preferably anhydrous ammonia is added or ammonium hydroxide (a source of ammonia) which reacts with the acidified material produced in the first zone. Water is also added in the ammoniating zone to dissolve the ammonium salt created by the chemical reaction of the acid with the ammonia on the surface of the particles. In both the first and second zone, heat is generated so that the temperature of the material is increased preferably to greater than 65.6° C. (150° F.), more preferably greater than 82.2° C. (180° F.), more preferably greater than 90° C. (194° F.), and most preferably greater than 98.9° C. (210° F.).

The material enters the next zone of the Reactor-Evaporator Drum which is another acidifying zone as described previously. Then the material passes to another ammoniating zone where both ammonia or an ammonia source and water are added as described previously, and finally to the evaporative drying and cooling zone which is as described previously. The poultry liter-based fertilizer leaving the drum preferably has a moisture content of less than 12%, more preferably less than 10%, and most preferably less than 8% water.

Alternatively, the Reactor-Evaporator Drum may be modified to have seven zones with the first four as the first four described above and the last three being an additional acidifier zone followed by an ammoniating zone followed by an evaporative cooling zone. As another alternative if desired, the Reactor-Evaporator Drum may be designed with either four zones or six zones eliminating the last evaporative cooling zone from the five zone or seven zone Reactor-Evaporator Drums respectively. In the case of the four zone and six zone drums, the final evaporative cooling step when needed is performed in a separate drum, a fluid bed, or other drying and cooling technology known to those familiar in the art of drying and cooling material.

For the present invention, granular fertilizer means fertilizer particles that are formed by agglomeration of smaller particles held together by the crystallization of compounds formed during the reaction of materials in the process.

Pelletized refers to particles formed through compaction of smaller particles.

DETAILED DESCRIPTION OF THE INVENTION

The invention will be explained by reference to attached non-limiting figures.

Figure 1A:
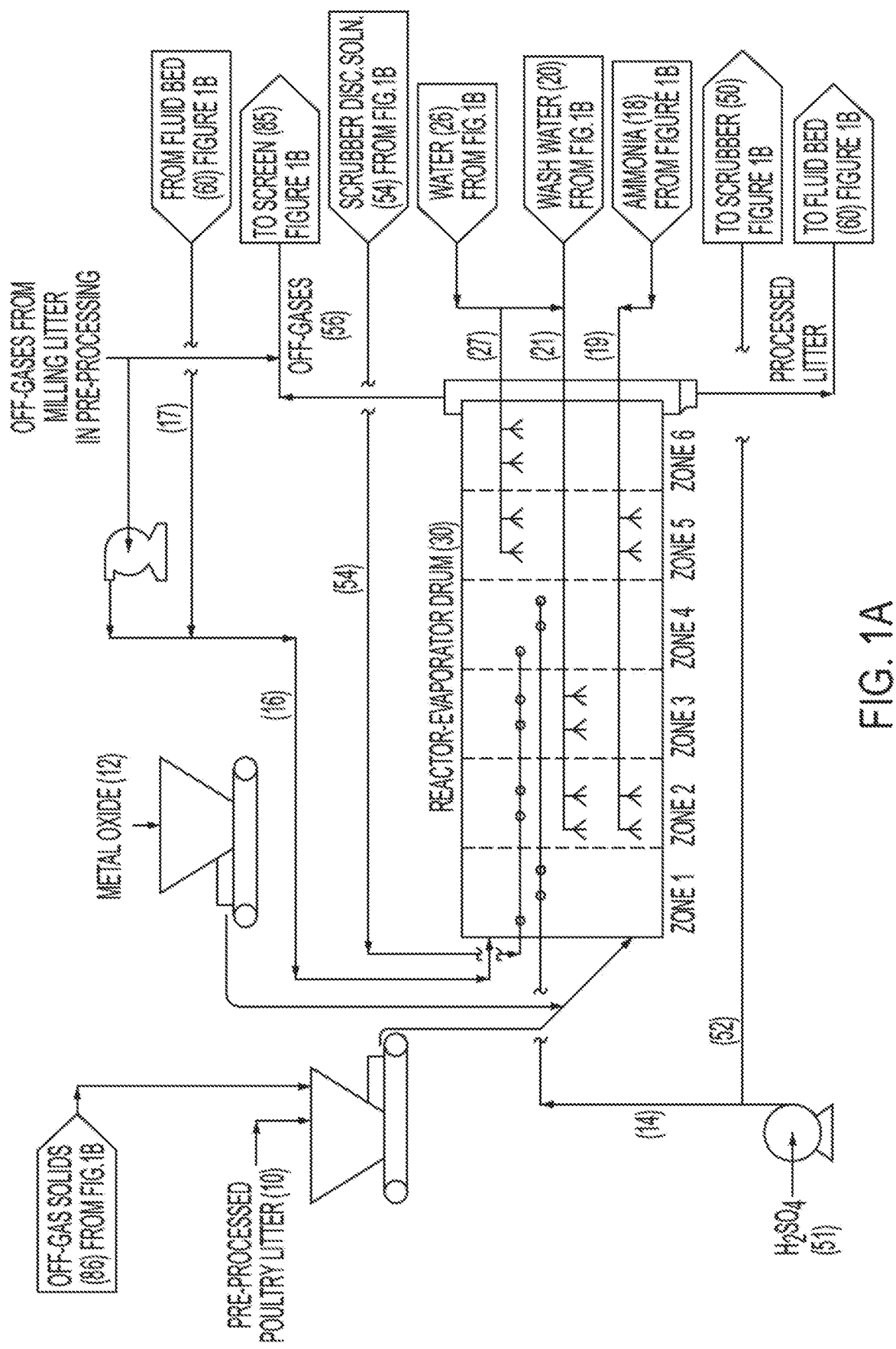
FIG. 1A: a process flow diagram of the process for converting poultry litter to valuable fertilizer using a single Reactor-Evaporator Drum with multiple zones
Figure 1B:
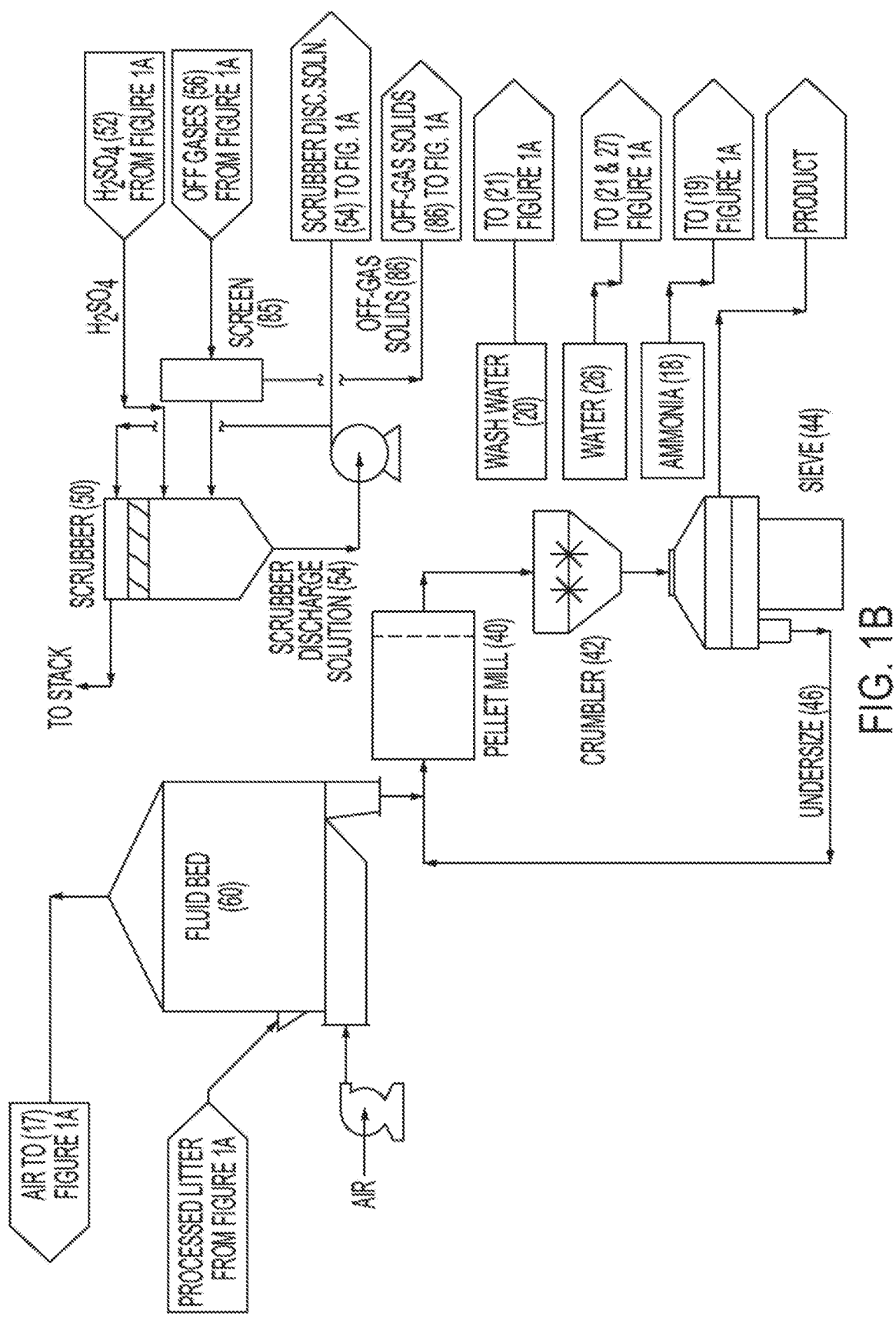
FIG. 1B: a continuation of FIG. 1A FIG. 2: an example pH profile for material passing through the sequential zones of a Reactor-Evaporator Drum

Referring to FIGS. 1A and 1B.

Pre-processed Raw Poultry Litter (10) that is typically at 20-30% moisture; has removed from it solid contaminants like metal, glass, and plastic; and has been milled to pass through a 0.48 cm to 1.27 cm (³⁄₁₆ inch to ½ inch) screen is precisely metered into a modified rotary Reactor-Evaporator Drum (30) (also referred to as a vessel) having multiple Zones (also referred to as chambers) separated by baffles.

If desired, metals and/or metal oxides and/or metal salts can be precisely metered (12) into Zone 1 to increase the secondary nutrients and/or micronutrients in the final product.

During Step 1 of the drum process, the litter (10) enters Zone 1 of the Reactor-Evaporator Drum (30) where acid (51) and/or source of acid (such as oleum and/or sulfur trioxide) is added (14) to lower the pH, generate heat, react with the nitrogen compounds and other odor producing compounds in the litter to stabilize them, and to react with metals or metal oxides to produce plant-available nutrients. Scrubber Discharge Solution (54) may also be added in Zone 1. The acid and/or source of acid can be added in amount so that the acidified material has a pH of less than 3, preferably less than 2, more preferably less than 1. The heat generated and the low pH of 3 or less kills pathogens, destroys drugs, kills weed seeds, and drives off moisture present in the litter. The acid and/or source of acid can be sprayed onto the falling material in Zone 1.

Next in Step 2, the now acidified material enters Zone 2 of the Reactor-Evaporator Drum (30) where ammonia (18) and/or source of ammonia is added (19) into the acidified material. Preferably ammonia (18) or ammonium hydroxide (source of ammonia) is added to react with the acidified material in the drum bed and thereby produce an ammonium salt or ammonium salts as well as generate additional heat. The ammonia and/or source of ammonia can be sprayed into the acidified material falling in the Zone 2. The ammonia and/or source of ammonia can be added in an amount to raise the pH of the ammoniated mixture not to exceed preferably 6.4, more preferably 6.2 and most preferably 6.0. The pH is preferably not raised too high to retain the ammonium in solid or liquid form and avoid forming ammonia gas. Although counterintuitive to producing a dry product; water (26), wash water (20), and/or scrubber solution (54) is sprayed onto the material during this step. This is a necessary and surprising solution to the unexpected problem of ammonium sulfate forming a crust on the surface of the forming granules so that ammonia cannot penetrate into the granule and react with acid. Adding water is necessary to allow the addition of more sulfuric acid and the reaction of more ammonia to elevate the levels of nitrogen and at the same time raise the pH of the product above 4.0. Without the addition of water, the ammonia never penetrates the granule and the acid on the inside of the granule does not react resulting in a product with a pH below 4.0 or a product with a nitrogen level below 6%. Any produced ammonia in the air stream through the drum can be scrubbed with acid to retain it in the system and prevent producing a waste stream.

For Step 3, the ammoniated material now enters Zone 3, the first evaporative cooling zone of Reactor-Evaporator Drum (30). In Zone 3, water is evaporated and swept away by air entering the drum (16) and flowing through the Zones. If needed to promote further evaporative cooling, water (26) can be sprayed (21) in any of the Zones. The water added can be wash water (20) when available from wash down of the equipment and surrounding areas, or a waste stream. Scrubber Solution (54) may also be sprayed in Zone 3.

Before subjecting the ammoniated material to another acidification step, the ammoniated material must be dried and cooled to maintain a semi-solid or solid particulate form that is free-flowing. If the water content is too high, ammonium salts will dissolve and form clumped material that is not free-flowing. After the ammoniated material has dried and cooled to below 80° C. (176° F.), more preferably to below 76.7° C. (170° F.), more preferably below 71.1° C. (160° F.), and most preferably below 65.6° C. (150° F.); the dried and cooled ammoniated material enters Zone 4 of Reactor-Evaporator Drum (30) where it is again acidified as described in Step 1 above. Next, the acidified material enters Zone 5 of Reactor-Evaporator Drum (30) where it is again ammoniated as described in Step 2 above to form an ammoniated material. In Zone 5, the final ammoniating step, only water (26) is sprayed to dissolve ammonium salt crust on the granule and to cool the material. Wash water (20) is not sprayed since it may contain unreacted chicken litter and Scrubber Solution (54) is not sprayed since it may contain sulfuric acid that may not have the opportunity to react.

In the final step, the ammoniated material having a desired nitrogen content enters Zone 6 of the Reactor-Evaporator Drum (30), another evaporative cooling zone where the litter is cooled until the temperature is less than 80° C. (176° F.), more preferably less than 71.1° C. (160° F.), more preferably less than 65.6° C. (150° F.), and most preferably less than 54.4° C. (130° F.). In Zone 6, water is evaporated and swept away by air entering the drum (16). If needed to promote further evaporative cooling, water (26) can be sprayed (27).

The acidification, ammoniating, and drying and cooling steps can be repeated as desired to increase the nitrogen content in the final product to a desired level.

The off-gases and dust (56) from the Reactor-Evaporator Drum (30) and other dust collection equipment are passed through the Screen (85) to separate solids from the gas stream. These Off-Gas Solids (86) can be recycled back to feed into the drum (30) with the Pre-Processed Poultry Litter (10)

The essentially solids-free off-gases from Screen (85) pass to the Scrubber (50) where they are scrubbed with acid (52). The scrubber discharge solution (waste stream) can be recycled (54) back into Reactor-Evaporator Drum (30) in Zone 1 and/or Zone 4.

The treated litter exits Reactor-Evaporator Drum (30) and if further cooling is needed is sent to Fluid Bed (60). The heated air from Fluid Bed (60) is recycled back (17) into the air (16) sent to Reactor-Evaporator Drum (30).

The entire process through the drum (30) can be conducted in a continuous manner, with new poultry litter continuously being added to the input of the drum (30) and dried poultry litter-based fertilizer being continuously expelled from the drum (30). The continuous process can surprisingly be conducted with no additional heat from burning fossil fuels, no significant carbon dioxide expelled, and no significant contaminants expelled. The main components expelled from the drum (30) are only water vapor to remove heat and the final poultry litter-based fertilizer product. An air stream can be continuously flowed through the Zones in the drum (30) to help remove the heat and water vapor from the drum (30), and any contaminates, acid or ammonia in the air stream can be removed using a screen and a scrubber. A waste stream from the scrubber can be supplied any of the Zones before the final ammoniating zone and evaporative cooling zone.

The fertilizer is now sufficiently granulated leaving the drum but if a harder and less friable product is desired, the fertilizer now may be sent to Pellet Mill (40) where the material is pelletized.

If pelletized, next, the fertilizer enters a Crumbler (42) where the size of the pellets is reduced.

The final dry pelletized fertilizer is sent to a Sieve (44) and the screened product is separated from the undersize material (46) which can be recycled back to Pellet Mill (40).

By repeatedly processing the poultry litter through a series of chemical reactions using acids and/or oleum and/or sulfur trioxide followed by bases and water and providing a zone for evaporation; the nitrogen levels and/or sulfur levels are elevated; the secondary nutrient levels and/or micronutrient levels are elevated if desired; the phosphorus and potassium levels are reduced; the organic carbon level is preferably greater than 10%, more preferably greater than 18%, and most preferably greater than 20%; and the product is dried. Based on the present description, one skilled in the art will be enabled to modify the prior art Reactor-Evaporator Drum as desired to provide any desired additional acidifying, ammoniating, and evaporative drying and cooling zones as needed.

A plant producing 2.72 metric tons per hour (3.00 U.S. tons/hour) of product running for 24 hours using poultry litter with 30% moisture content and producing a product with 10% nitrogen would require 19.0 kg (41.8 pounds) of water for every 45.4 kg (100 pounds) of product produced. This is equal to 27,342 liters (7,223 gallons) of water per day. Water used may be in the form of clean water, reclaimed water, plant wash down water (wash water), and/or scrubber discharge solution. The use of plant wash down water and scrubber discharge solution as water in the process provides benefits beyond emissions control, it also means that there is less utility water demand which is especially important for areas with low levels of available potable water.

Figure 2:
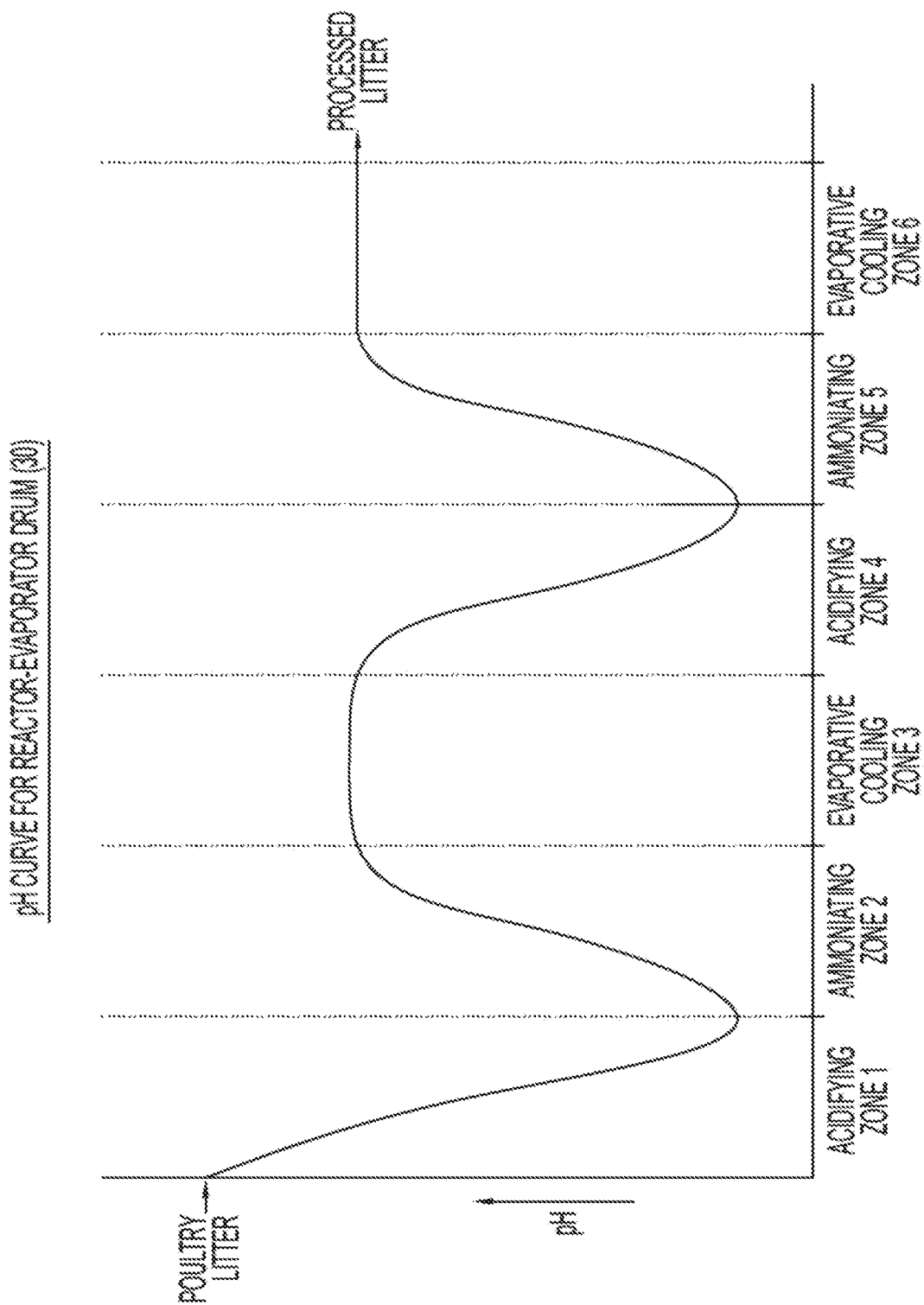

Referring to FIG. 2.

One possible pH profile of the material as it passes through the process in Reactor-Evaporator Drum (30) is shown. With addition of sulfuric acid in Zone 1, the pH of the material drops dramatically. Next, as ammonia is added in Zone 2, the pH of the material is increased but not allowed to exceed preferably 6.4, more preferably 6.2 and most preferably 6.0. The pH of the material does not change in the evaporative cooling zone, Zone 3. These steps repeat again respectively in Zone 4, Zone 5, and Zone 6; and the final pH of the particulate material does not exceed preferably 6.4, more preferably 6.2 and most preferably 6.0.

Figure 3:
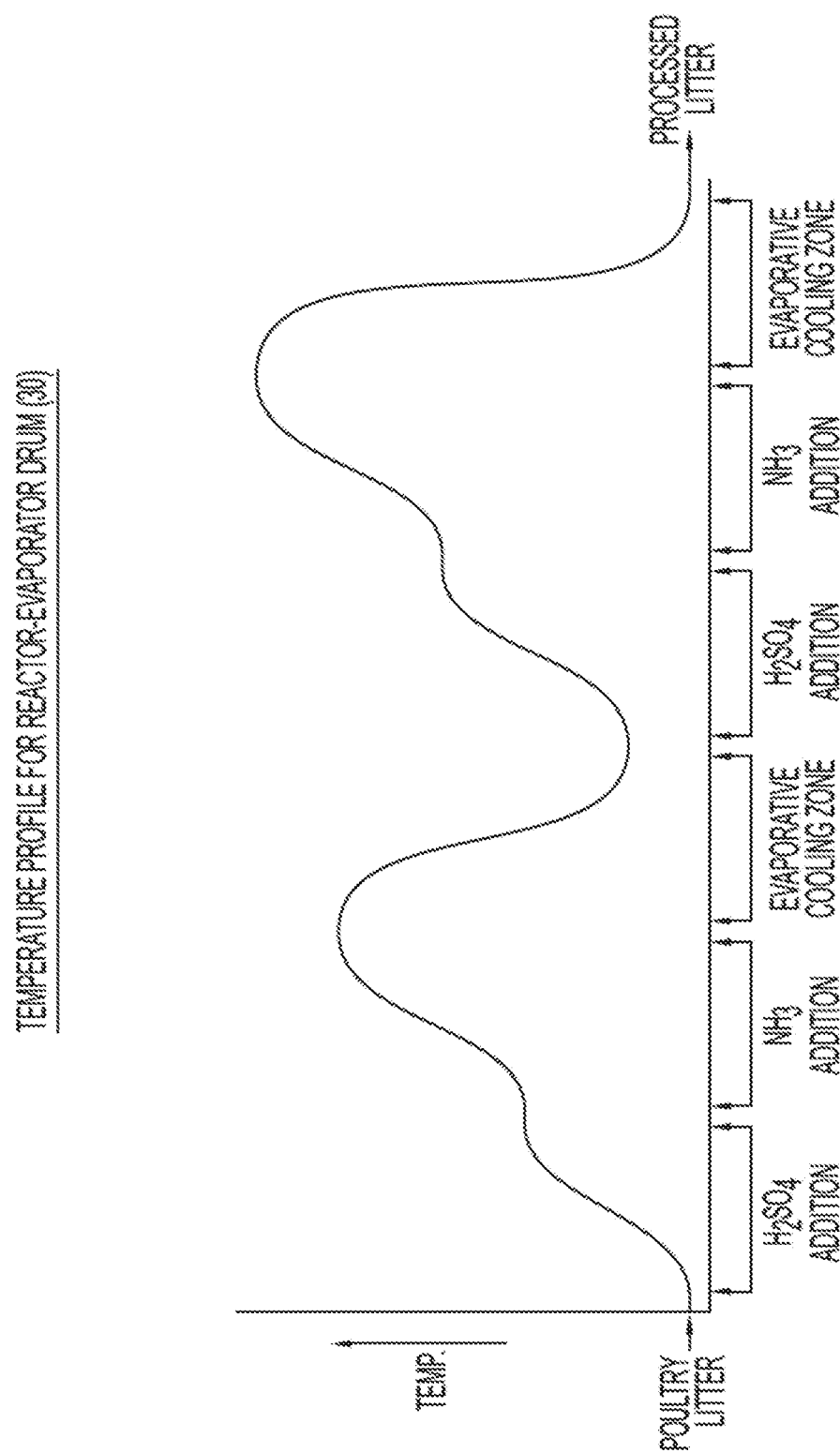
FIG. 3: an example temperature curve for material passing through the sequential zones of a Reactor-Evaporator Drum

Referring to FIG. 3.

One possible temperature profile of the litter as it passes through the process in the Reactor-Evaporator drum is shown. With the addition of sulfuric acid, the litter begins to heat due to heat of dilution and heat of reaction and with ammonia in the poultry litter. Next, as the ammonia is added, the litter heats further due to the heat of reaction. The litter is cooled dramatically in the evaporative cooling zone. These steps repeat again with the litter exiting at a temperature less than a predetermined target temperature.

Figure 4:
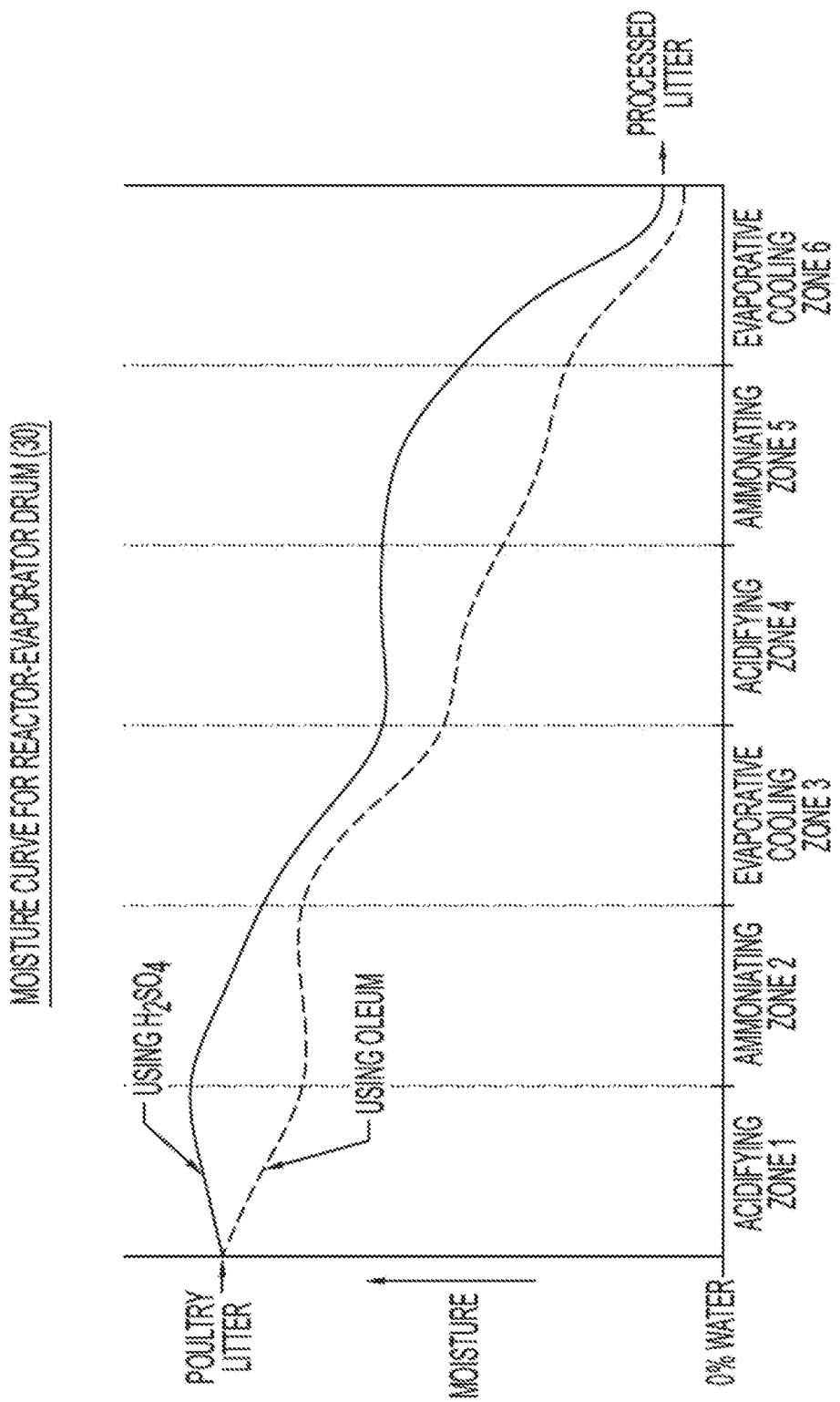
FIG. 4: an example moisture curve for material passing through the sequential zones of a Reactor-Evaporator Drum

Referring to FIG. 4.

Possible moisture profiles for the litter are provided as it passes through the process using either sulfuric acid or oleum in the Acidifying Zones 1 and 4. As can be seen, the moisture may rise slightly with the addition of some water in the sulfuric acid. However, with the use of oleum, water is used up by the reaction of sulfur trioxide with water in the litter to produce sulfuric acid. Although water is sprayed during the ammoniating step, the moisture decreases slightly in the Ammoniating Zones 2 and 5 due to evaporative cooling. The moisture decreases dramatically in the Evaporative Cooling Zones 3 and 6. The litter exiting the Reactor-Evaporator Drum is essentially free of moisture based on the desired moisture levels of the product.

Figure 5:
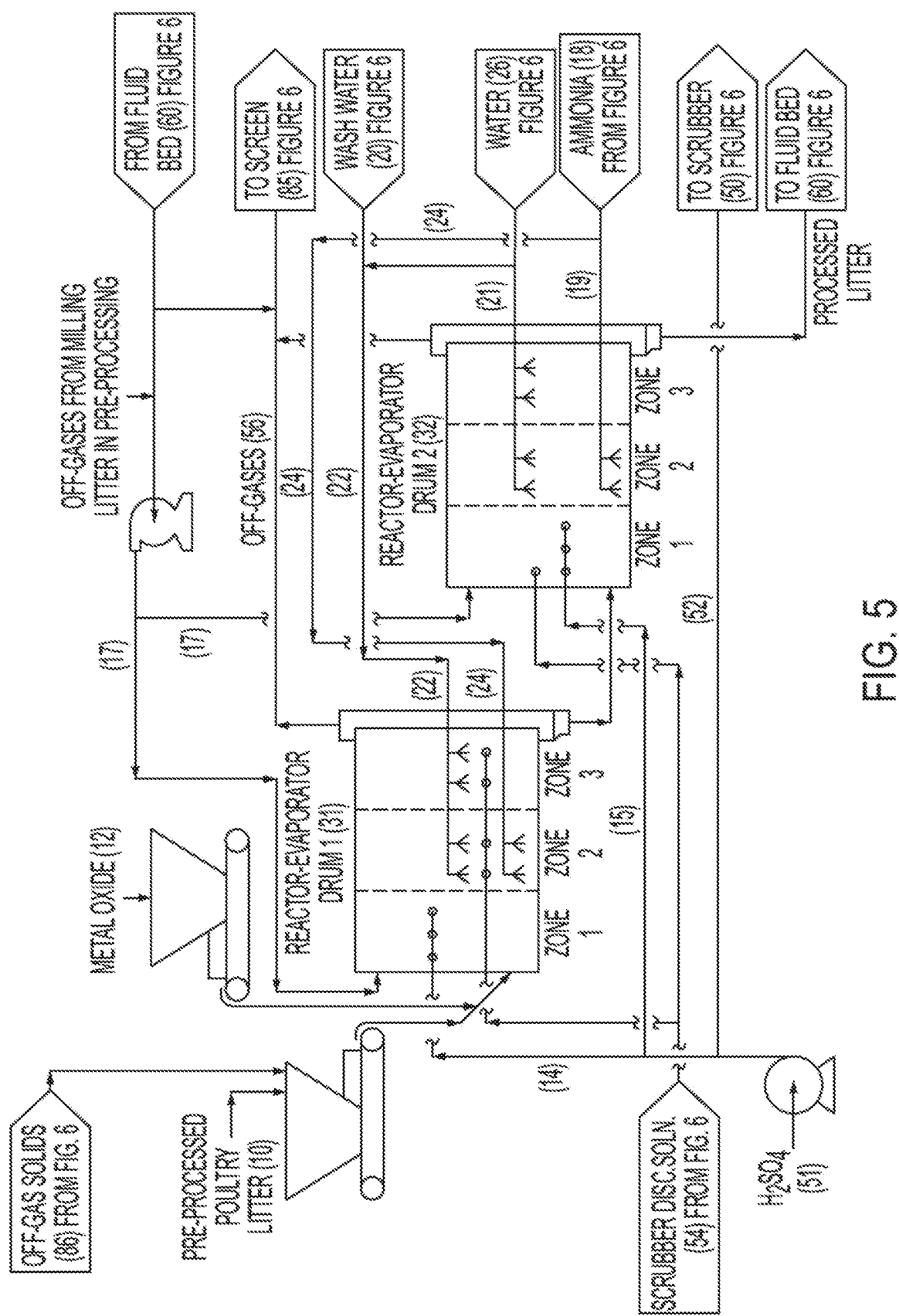
FIG. 5: a process flow diagram of the process for converting poultry litter to valuable fertilizer using two Reactor-Evaporator Drums with multiple zones.
Figure 6:
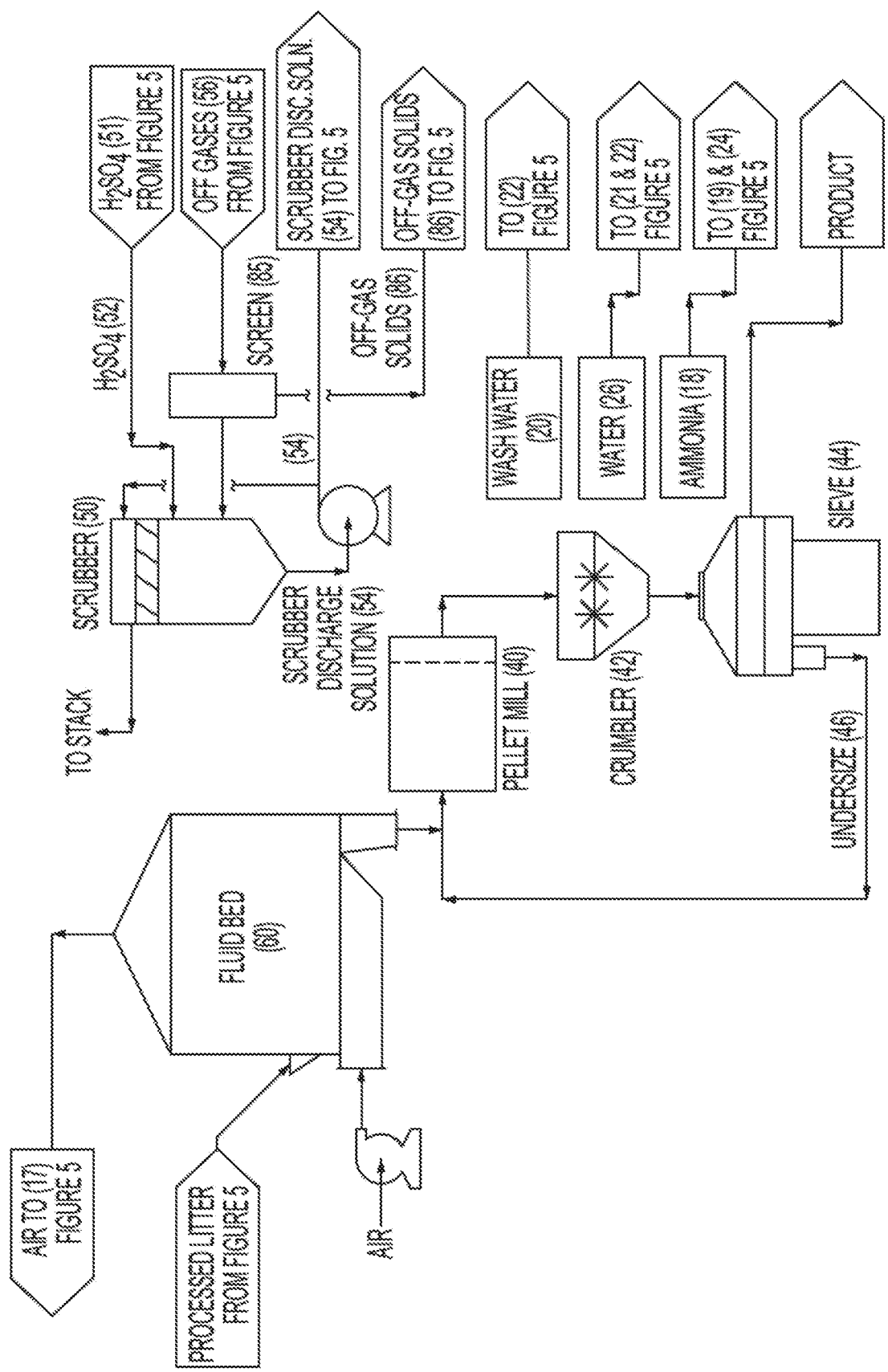
FIG. 6: a continuation of the process flow diagram of FIG. 5.

Referring to FIG. 5 and FIG. 6.

Pre-processed Raw Poultry Litter (10) that is typically at 20-30% moisture; has removed from it solid contaminants like metal, glass, and plastic; and has been milled to pass through a 0.48 cm to 1.27 cm (³⁄₁₆ inch to ½ inch) screen is precisely metered into a rotary Reactor-Evaporator Drum 1 (31).

If desired, metals and/or metal oxides and/or metal salts are precisely metered (12) into Zone 1 to increase the secondary nutrients and/or micronutrients in the final product.

The litter (10) enters Zone 1 of Reactor-Evaporator Drum 1 (31) where acid (51) (and/or oleum and/or sulfur trioxide) is added (14) to lower the pH, generate heat, react with the nitrogen compounds and other odor producing compounds in the litter to stabilize them, and to react with metals or metal oxides to produce plant-available nutrients. The heat generated and the low pH kills pathogens, destroys drugs, kills weed seeds, and drives off moisture present in the litter. Scrubber Discharge Solution (54) may also be added in Zone 1 of Drum (31).

Next, the now acidified litter enters Zone 2 of Reactor-Evaporator Drum 1 (31) where a base is added (24) to the litter, preferably ammonia (18) or ammonium hydroxide, to react with the acidified litter in the drum bed and thereby produce an ammonium salt or ammonium salts as well as generate additional heat. Water (26) and/or Wash Water (20) is also sprayed to dissolve ammonium salt that forms on the surface of granules as they form and thereby ensure that the base reacts with acid at the center of the granule. Scrubber Solution (54) may also be sprayed in this Zone to dissolve ammonium salt and to cool the material.

The treated litter now enters Zone 3, the evaporative cooling zone of Reactor-Evaporator Drum 1 (31). In Zone 3, water is evaporated and swept away by air entering the drum (17). If needed to promote further evaporative cooling, Water (26) is sprayed (22). The water added may be wash water (20) when available from wash down of the equipment and surrounding areas and/or Scrubber Solution (54) may be used.

After the treated litter has cooled preferably to below 80° C. (176° F.), more preferably to below 76.7° C. (170° F.), more preferably below 71.1° C. (160° F.), and most preferably below 65.6° C. (150° F.); it exits Reactor-Evaporator Drum 1 (31) and enters Zone 1 of the Reactor-Evaporator Drum 2 (32) where acid (51) (and/or oleum and/or sulfur trioxide) is added (15) to lower the pH, generate heat, react with the nitrogen compounds and other odor producing compounds in the litter to stabilize them, and to react with metals or metal oxides to produce plant-available nutrients. The heat generated and the low pH kills pathogens, destroys drugs, kills weed seeds, and drives off moisture present in the litter. Scrubber Discharge Solution (54) may also be added in Zone 1 of Drum (32).

Next, the treated litter enters Zone 2 of Reactor-Evaporator Drum 2 (32); water (26) is sprayed and a base is added (19) to the litter, preferably ammonia (18) or ammonium hydroxide, to react with the acidified litter in the drum bed and thereby produce an ammonium salt or ammonium salts as well as generate additional heat. Water (26) is sprayed to dissolve ammonium salt that forms on the surface of granules as they form and thereby ensure that the base reacts with acid at the center of the granule.

Next, the treated litter enters Zone 3 of Reactor-Evaporator Drum 2 (32), another evaporative cooling zone where the litter is cooled until the temperature is preferably less than 71.1° C. (160° F.), more preferably less than 65.5° C. (150° F.), and most preferably less than 54.4° C. (130° F.). In Zone 3 of Reactor-Evaporator Drum 2 (32), water is evaporated and swept away by air entering the drum (17). If needed to promote further evaporative cooling, Water (26) is sprayed (21).

The off-gases and dust (56) from Reactor-Evaporator Drum 1 (31) and from Reactor-Evaporator Drum 2 (32) and from other dust collecting equipment pass through Screen (85) to separate the solids from the gases. The Off-Gas Solids (86) are recycled back into the Reactor-Evaporator Drum 1 (31) by adding them to the Pre-Processed Poultry Litter (10) being metered into the drum in Zone 1. The gases from Screen (85) pass through Scrubber (50) where they are scrubbed with acid (52). The Scrubber Discharge Solution (54) is recycled back into Reactor-Evaporator Drum 1 (31) and/or Reactor-Evaporator Drum 2 (32) in Zones 1 and/or 2 and/or 3 of Reactor-Evaporator Drum 1 (31) and Zone 1 of Reactor-Evaporator Drum 2 (32).

The dry treated litter exits Reactor-Evaporator Drum 2 (32) and if further cooling is needed is sent to Fluid Bed (60). The heated air from Fluid Bed (60) is recycled back into the air (17) sent to Reactor-Evaporator Drum 1 (31) and Reactor-Evaporator Drum 2 (32).

The fertilizer is now sufficiently granulated leaving the drum but if a harder and less friable product is desired, the fertilizer enters Pellet Mill (40) where the material is pelletized.

If pelletized, next, the fertilizer is sent to Crumbler (42) where the size of the pellets is reduced.

The dry fertilizer is sent to Sieve (44) and the screened product is separated from the undersize material which is recycled (46) back to Pellet Mill (40).

By repeatedly processing the poultry litter through a series of chemical reactions using acids and/or oleum and/or sulfur trioxide followed by bases, adding water to dissolve ammonium crust on granules, and providing a zone for evaporation; the nitrogen levels and/or sulfur levels are elevated; the secondary nutrient levels and/or micronutrient levels can now be elevated if desired; and the phosphorus and potassium levels are reduced. Additional Reactor-Evaporator Drums may be utilized as needed.

Figure 7:
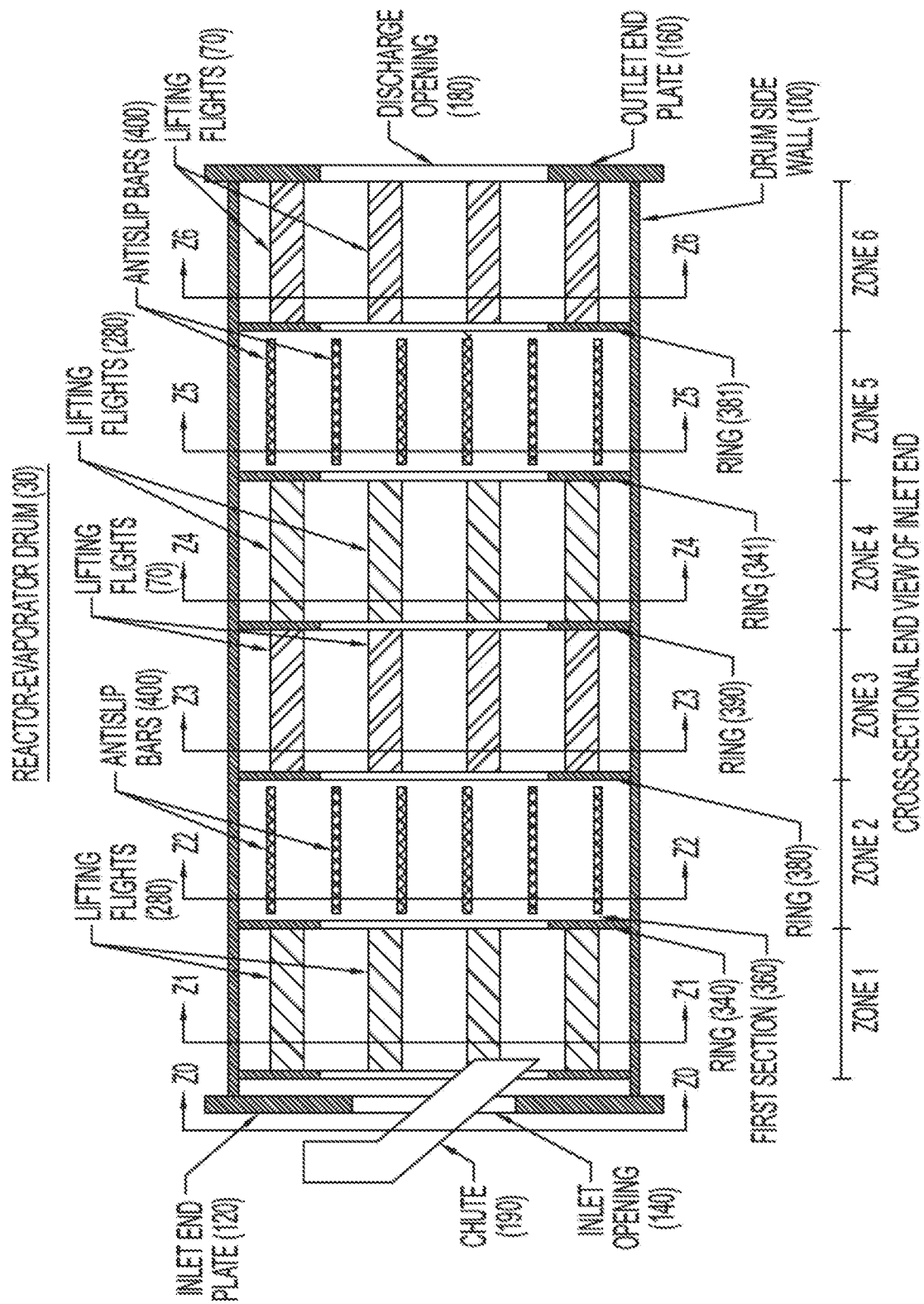
FIG. 7: a schematic longitudinal cross-sectional elevation view of a Reactor-Evaporator Rotary Drum embodying the principles of the present invention, with some parts omitted for clarity.
Figure 8:
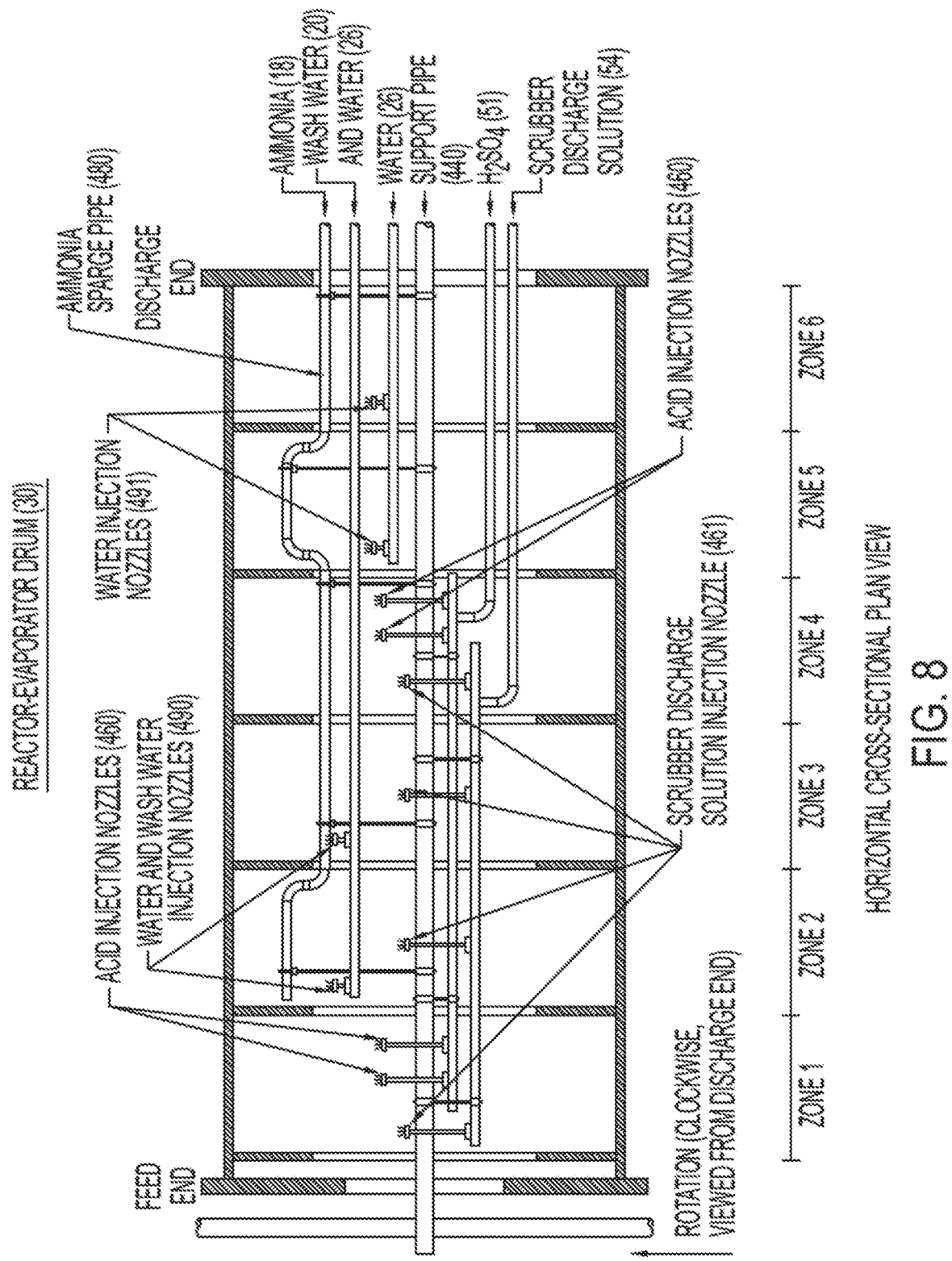
FIG. 8: a cross-sectional plan view of the Reactor-Evaporator Rotary Drum of FIG. 7 illustrating locations of acid injection inlets, scrubber solution discharge inlets, ammonia injection spargers, and wash water inlets with some parts omitted for clarity.
Figure 9:
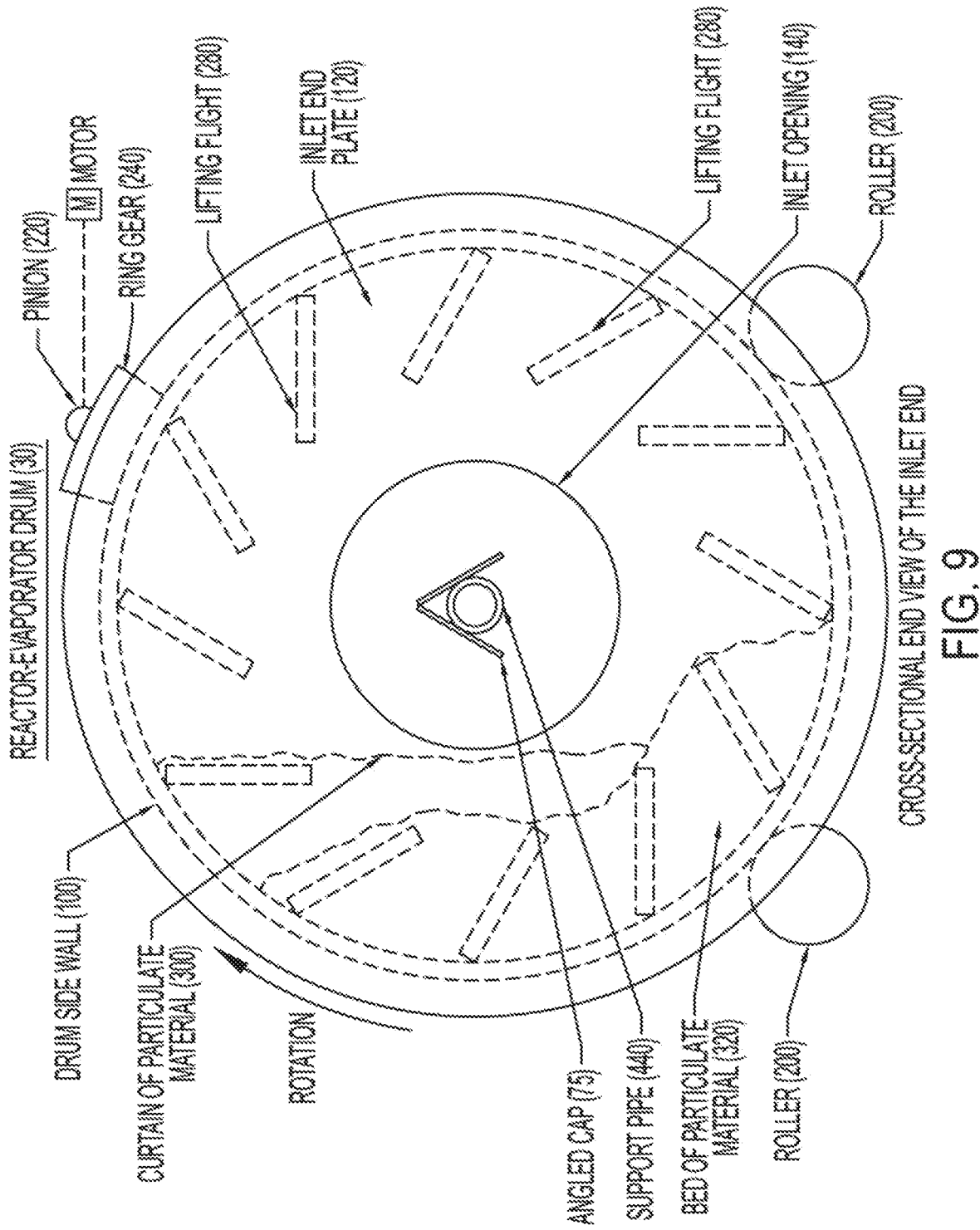
FIG. 9: a schematic cross-sectional end view of the inlet end of the drum of FIG. 7 looking in the direction of the arrows Z0-Z0.

Referring to FIGS. 7, 8, 9, 10, 11, and 12;

The Reactor-Evaporator Drum (30) shown in FIG. 7 includes a cylindrical side wall (100), an inlet end plate (120) having an axial inlet opening (140), and an outlet end plate (160) having an axial discharge opening (180). The Reactor-Evaporator Drum (30) is supported and rotatably driven in any conventional fashion and is slightly inclined downwardly toward its discharge end so that particulate material introduced through the inlet opening (140) by a chute (190) will travel through the drum (30) and be discharged through the discharge opening (180). As illustrated schematically in FIG. 9, the drum (30) can be supported on rollers (200) and rotatably driven by a motor (M) through a pinion (220) which engages a ring gear (240) secured to the drum side wall (100).

Figure 10:
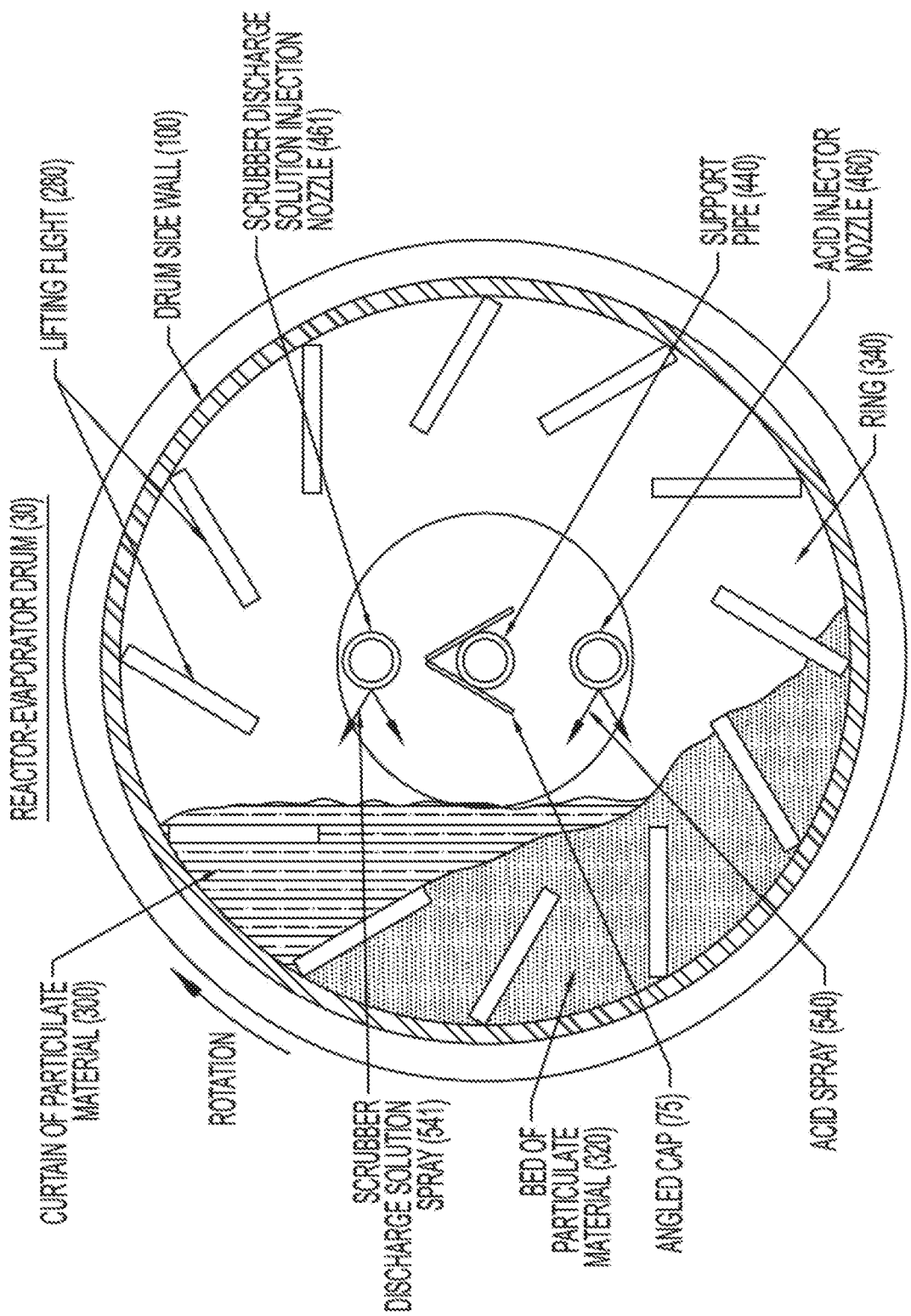
FIG. 10: a schematic cross-sectional view of Zone 1 and Zone 4 (acidifying zones) of the drum of FIG. 7 looking in the direction of the arrows Z1-Z1 and Z4-Z4 respectively.

Particulate material entering the drum (30) enters Zone 1 of FIG. 7, which is also shown as a cross-sectional view in FIG. 10, in which it is acidified. This acidifying zone is fitted with lifting flights (280) secured to the drum side wall (100). The flights (280) are canted in a direction opposite the direction of rotation of the drum (30), relative to an axial plane passing through the axis of the drum. A particularly suitable cant angle is 45°. Upon rotation of the Drum (30), flights (280) lift the particulate material in Zone 1 and drop it so that it falls and cascades as a stream or Curtain of Particulate Material (300). The bulk of the material rolls as a mass or bed of particulate matter (320) on the inner surface of the sidewall (100). The manner in which the flights (280) are canted ensures good mixing of the material without buildup or reverse flow problems. The width of the flights (280) should be between 10 and 20% of the drum's diameter.

The length of the flights (280) are the same as the length of Zone 1 in that the downstream ends of the flights (280) form the downstream end of Zone 1. At the end of the flights (280), there is a ring (340) secured to the drum side wall (100). Particulate material passing over this ring (340) enters the first section (360) of Zone 2. This first section (360) of Zone 2 is free of flights and/or antiskid bars. The section (360) free of flights may be longer or shorter than shown or it may be omitted.

Figure 11:
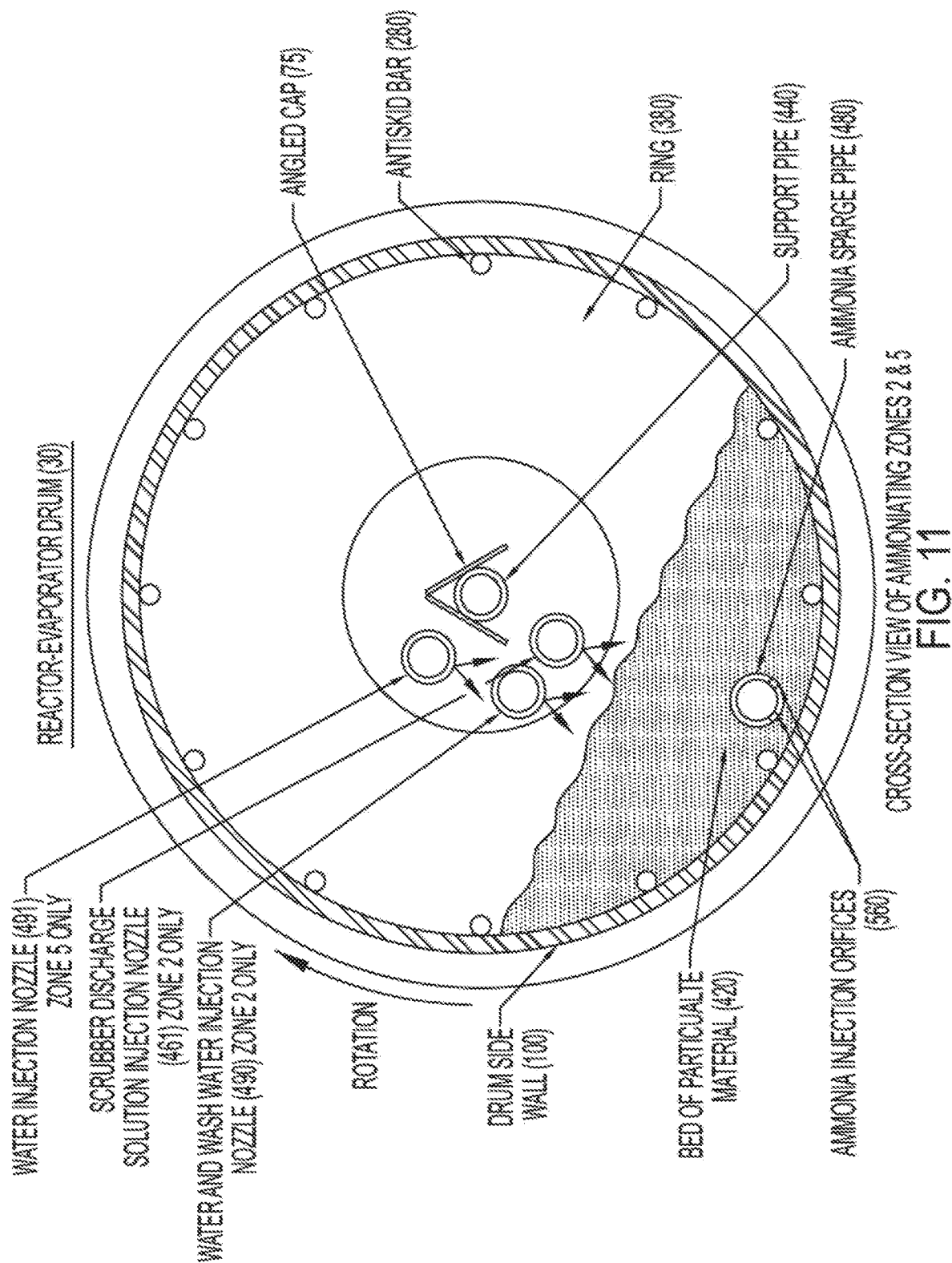
FIG. 11: a schematic cross-sectional view of Zone 2 and Zone 5 (ammoniating zones) of the drum of FIG. 7 looking in the direction of the arrows Z2-Z2 and Z5-Z5 respectively.
Figure 12:
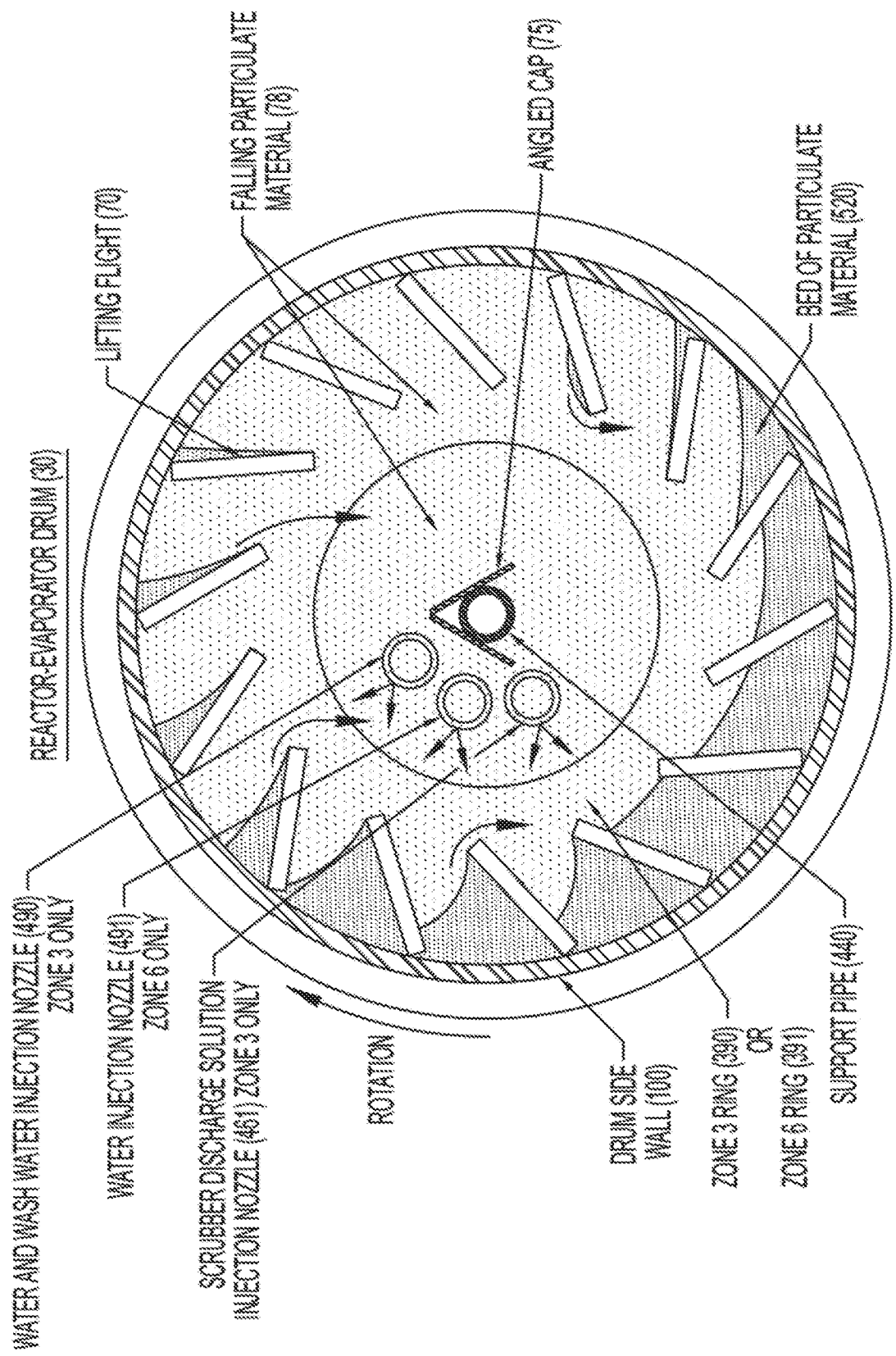
FIG. 12: a schematic cross-sectional view of Zone 3 and Zone 6 (evaporative cooling zones) of the drum of FIG. 7 looking in the direction of the arrows Z3-Z3 and Z6-Z6 respectively.

Downstream of the section (360) in Zone 2, ammonia is applied and which in the illustrated embodiment is fitted with antiskid bars (400) extending essentially the length of Zone 2. The bars (400) may be approximately 0.635 cm to 1.27 cm (¼ to ½ inch) in height to prevent the bed of particulate material (420) from slipping in Zone 2. As seen in FIG. 11, the bed (420) is a rolling bed of material in contact with the side wall (100), since the bars (400) are too low to function as lifting flights. Wash water (20) when available and/or water (26) is added in Zone 2 by spraying onto the rolling Bed of Particulate Material (420) through Water and Wash Water Injection Nozzles (490). Scrubber Discharge Solution (54) may also be sprayed in Zone 2 through Scrubber Discharge Solution Injection Nozzles (461).

At the end of Zone 2, there is a ring (380) secured to the drum side wall (100). Particulate material passing over this ring (380) enters Zone 3, the evaporative cooling zone. This evaporative cooling zone is fitted with lifting flights (70) secured to the drum side wall (100). The flights (70) are canted in the same direction as the direction of rotation of the drum (30), relative to an axial plane passing through the axis of the drum. Upon rotation of the Drum (30), flights (70) lift the particulate material in Zone 3 and drop it so that Falling Particulate Material (78) is cascading off and is airborne throughout the center cross-section of Zone 3. The manner in which the flights (70) are canted ensures that the material in the Bed of Particulate Material (520) is lifted and carried so that it cascades throughout the whole cross-section of Zone 3 and so that much of the material is in contact with the stream of air passing through the drum which maximizes the evaporation of water and the transfer of heat from the particulate material. The width of the flights (70) should be between 10 and 20% of the drum's diameter.

At the end of Zone 3, there is a ring (390) secured to the drum side wall (100). Particulate material passing over this ring (390) enters Zone 4. Zone 4 is another acidifying zone which duplicates the setup of lifting flights (280) of Zone 1.

At the end of Zone 4 is a ring (341) secured to the drum side wall (100). Particulate material passing over this ring enters Zone 5. Zone 5 is another ammoniating zone which duplicates the setup of antiskid bars of Zone 2.

At the end of Zone 5 is a ring (381) secured to the drum side wall (100). Particulate material passing over this ring enters Zone 6. Zone 6 is another evaporative cooling zone which duplicates the setup of lifting flights of Zone 3.

At the end of Zone 6 is a ring (391) secured to the end. Particulate material passing over this ring exits the Reactor-Evaporator Drum (30).

FIGS. 8, 9, 10, 11, and 12 show extending axially through the drum (30) a stationary support pipe (440) supported outside the drum by any suitable means (not shown). The support pipe (440) is covered by an angled cap (75) to prevent buildup of material on the pipe. The pipe (440) is provided as a support structure for a plurality of acid injection nozzles (460) in the acidifying zones of the drum (Zones 1 and 4), as a support structure for ammonia sparge pipe (480) in the ammoniating zones (Zones 2 and 5) of the drum (30), for a support structure for the Scrubber Discharge Solution Injection Nozzles (461) in the first section of Zones 1, 2, 3, and 4, as a support structure for the Water and Wash Water Injection Nozzles (490) in Zones 2 and 3, and as a support structure for the Water Injection Nozzles (491) in Zones 5 and 6. The manner in which the nozzles (460, 461, 490, and 491) and the sparge pipe (480) are mounted on the support pipe (440) forms no part of the invention and need not be described. The mounting means of the nozzles (460, 461, 490, and 491) is shown generally respectively. The number of nozzles may be more or less than the number shown.

The acid spray nozzles (460) are disposed in spaced relationship along essentially the whole of the length of Zone 1 and Zone 4. The nozzles are so located that their discharge orifices are aimed at the curtain (300) of free-falling material so that the Acid Spray (540) contacts the curtain (300) near its lower end. Alternatively, if sulfur trioxide gas is used to acidify the litter in Zones 1 and 4, the gas is injected beneath the surface of the bed and antiskid bars are used instead of lifting flights in the manner explained in Zones 2 and 5. The Scrubber Discharge Solution Injection Nozzles (461) are in the initial length of Zone 1, Zone 2, Zone 3, and Zone 4. The nozzles are so located that their discharge orifices are aimed at the curtain (300) of free-falling material so that the Scrubber Discharge Solution Spray (541) contacts the Curtain of Particulate Material (300) or at the fastest moving part of the Bed of Particulate Material (320) when lifting flights are not present. The location of the ammonia sparge pipe (480) is within the bed of particulate material (420) in Zones 2 and 5 near the lower end of the bed so that ammonia injected from orifices (560) in the pipe (480) has the maximum time to disperse and react with the acidified particulate material before being exposed to the surface of the bed. The distance of the orifices (560) from the side wall of the drum (100) should be no greater than ½ the depth of the bed of particulate material (420). The diameter of the discharge opening (180) is such that, typically, a bed of about 25.4 cm (10 inches) exists in Zone 2 and Zone 5.

Water and Wash Water Injection Nozzles (490) are in Zone 2 and Zone 3. The nozzles are so located that their discharge orifices are aimed at the fastest moving part of the Bed of Particulate Material (320). The Water Injection Nozzles (491) are the length of Zone 5 and Zone 6. The nozzles are so located that their discharge orifices are aimed at the fastest moving part of the Bed of Particulate Material (320).

Furthermore, any desired additives can be added to the system to provide any desired result, such as materials commonly added to fertilizers.

One preferred inventive fertilizer produced by the process has % N of more than 6%, more preferably more than 8%, and most preferably more than 10%; moisture content of preferably less than 12% water, more preferably less than 10% water, and most preferably less than 5% water; phosphorus content of less than 2%; sulfur content of more than 10%; and total other nutrient, secondary nutrient, and micronutrient content of preferably more than 2.5%, more preferably more than 3%, and most preferably more than 4%. All phosphorus, potassium and micronutrients in the product originate from the starting litter supplied to the process. The product is comprised of up to 2.5% nitrogen resulting directly from the nitrogen in the starting poultry litter. Remaining nitrogen in the product results from ammonia used in the process.

The inventive fertilizer is free of noxious odors, pathogens, drugs, steroids, hormones, even when wet or stored in a humid environment. The pH of the fertilizer product is preferably between 4 and 6.5 and more preferably between 5 and 6.

In a preferred embodiment, the inventive fertilizer product contains preferably more than 11% organic carbon and more preferably more than 14% carbon which results from the starting poultry litter.

A preferred form of the inventive fertilizer is a smooth, hard granule that is 1 mm to 3 mm in size.

In a preferred embodiment, the fertilizer comprises at least 8% nitrogen and at least 13% of the nitrogen in the fertilizer is from nitrogen in the starting poultry litter; 10% bedding material from poultry litter; 0.91% potassium from potassium in the starting litter; at least 9% sulfur; and total other nutrient, secondary nutrient, and micronutrient content of preferably more than 2.5%, more preferably more than 3%, and most preferably more than 4%.

In a preferred embodiment, the fertilizer comprises at least 30% ammonium sulfate, more preferably at least 40% ammonium sulfate, and most preferably at least 45% ammonium sulfate.

In a preferred embodiment of the invention, water added during the process is added at weight of water per 45.4 kg (100 pounds) product for each unit of nitrogen in the product at the rate in the range of 0.454 kg to 2.72 kg (1 pound to 6 pounds) water, more preferably 0.907 kg to 2.27 kg (2 pounds to 5 pounds) water, and most preferably 1.36 kg to 2.04 kg (3 pounds to 4.5 pounds) water. A unit of nitrogen is 1 wt. % nitrogen by dry weight. Because of the large amount of water needed, plant wash down (wash water) and scrubber discharge solution can be used to provide at least a portion of this water. The product resulting from the process is less than 10% moisture. Furthermore, no fossil fuels are needed in the process and there are no waste streams generated by the process except water vapor.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

EXAMPLES

Statements that can be made from the Examples below.

It was observed in the examples that when the material began to accumulate a white crust on the granules during the ammoniating step that the pH of the material would stay low (below 5.5) no matter how much ammonia was sparged. At this point water was sprayed onto the bed of material to dissolve the white crust forming and the pH would again begin to rise as the ammonia reacted with the sulfuric acid. Several examples were done to adjust the application of acid, water, and ammonia to check the resulting product for nitrogen level, moisture, size distribution, crush strength, and to have enough to pelletize.

The fertilizer product produced was granular with a crush strength of at least 4.45 newtons (1.55 pounds) and a moisture of between 8% and 12%. About 90% of the granular product was in the in 1 mm to 3.35 mm size range.

The nitrogen in the starting litter was 2.75% and all of this nitrogen from the starting litter was contained in the final product.

1. The carbon in the products came from the starting litter and was greater than 10%.
2. The $K_2O$ in the starting litter was greater than 2.9% $K_2O$ (2.4% K).
3. The $K_2O$ in the products was from the starting litter and was greater than 1.1% $K_2O$ (0.91% K).

Example 1

For this example, a smooth, round, hard granular fertilizer product was produced with a nitrogen level of 10.4%. To accomplish this and as well as Examples 2-12, the litter was passed through three sets of acidifying and ammoniating steps and water was added during the ammoniating step each time.

Poultry litter from the clean out of a poultry house in Carthage, Miss. was used as the poultry litter source for the process. This poultry house used pine shavings as their bedding material. The houses were de-caked every seven weeks and the clean out was done after two years of de-caking. The litter was milled to pass a 0.48 cm (³⁄₁₆ inch) screen. The moisture in the milled litter was 22%. The litter was analyzed for nutrient content and the results are shown in Table 1.

TABLE 1

| Mississippi Raw Litter Analyis | | | | | | | | | | | | | |
|---|---|---|---|---|---|---|---|---|---|---|---|---|---|
| % N | % $P_2O_5$ | % $K_2O$ | % S | % Zn | % Mg | % Ca | % Fe | % Al | % Mn | % Mo | % B | % Cu |
| 2.75 | 3.51 | 2.93 | 1.36 | 0.04 | 0.58 | 2.73 | 0.22 | 0.37 | 0.04 | 0.00 | 0.004 | 0.014 |

Step 1: First Acidifying Step 0.68 kg (1.5 pounds) of litter was placed in a 50.8 cm (20 inch) diameter rotary Acidifying Drum (AcD) equipped with lifting flights. With AcD running at a speed to produce a falling curtain of material, 0.138 kg (0.305 pounds) of 98% sulfuric acid was sprayed onto the base of the falling curtain using a SS Unitjet 11001 spray nozzle. The acidified material was transferred to a second 50.8 cm (20 inch) diameter rotary Ammoniating Drum (AmD) equipped with anti-slip rods. Another 0.68 kg (1.5 pounds) of litter was placed in the AcD and sprayed as before with 0.139 kg (0.306 pounds) of 98% sulfuric acid. This second batch of acidified litter was transferred to the AmD.

Step 2: First Ammoniating Step

With both batches of acidified litter from Step 1 in AmD, AmD was run at a speed to produce a rolling bed of material and ammonia was sparged into the deepest part of the bed. The pH of the material was measured using pH paper by crushing a few granules and wetting with water. A total of 0.0485 kg (0.107 pounds) of water was sprayed onto the bed of material. When the pH of the material reached 5.5, the ammonia was stopped. The moisture was then measured at 13.9%.

Step 3: Second Acidifying Step

Half of the material from Step 2 was placed in AcD and as described in Step 1, was acidified with 0.107 kg (0.235 pounds) of 98% sulfuric acid. This was removed from AcD and the other half of material from Step 2 was placed in AcD and acidified with 0.122 kg (0.270 pounds) of 98% sulfuric acid.

Step 4: Second Ammoniating Step

Both of the acidified batches from Step 3 were combined in AmD and sparged as described before with ammonia until the pH was 6.0. During the ammonia sparging, 0.184 kg (0.406 pounds) of water was added. The moisture at the end of the ammoniating step was 9.3%

Step 5: Third Acidifying Step

Half of the material from Step 4 was placed in AcD and as described in Step 1, was acidified with 0.137 kg (0.301 pounds) of 98% sulfuric acid. This was removed from AcD and the other half of material from Step 4 was placed in AcD and acidified with 0.104 kg (0.0.229 pounds) of 98% sulfuric acid.

Step 6: Third Ammoniating Step

Both of the acidified batches from Step 5 were combined in AmD and sparged as described before with ammonia until the pH was 5.5. During the ammonia sparging, 0.196 kg (0.432 pounds) of water was added. The moisture of the final product was 8.7%. The weight of the fertilizer produced was 2.23 kg (4.91 pounds).

Example 2

This example tested the enhancement of the product with zinc by adding zinc oxide to the starting litter. The nutrient analysis of the product is given in Table 3. The resulting product was a smooth, round, hard granule with almost all of the product in the size range of 1 mm to 3.35 mm and a nitrogen level of 10.2%.

Using the same milled and screened litter as Example 1, 14.7 g of zinc oxide was split into two batches and added to the material in the rotating AcD before the acid was sprayed. After adding the zinc oxide, the same steps were followed as described for Example 1 noting the following parameters for each step.

Step 1: First Acidifying Step 0.137 kg (0.301 pounds) of 98% sulfuric acid was sprayed on the first 0.68 kg (1.5 pounds) of litter and 0.140 kg (0.308 pounds) of 98% sulfuric acid was sprayed on the second 0.68 kg (1.5 pounds) of litter.

Step 2: First Ammoniating Step

Ammonia was sparged into the combined batches from Step 1 until the pH was 7.0. The water added during the ammoniating step was 0.111 kg (0.245 pounds) and the final moisture was 14.2%

Step 3: Second Acidifying Step 0.140 kg (0.308 pounds) of 98% sulfuric acid was sprayed on half of the material from Step 2 and 0.140 kg (0.308 pounds) of 98% sulfuric acid was sprayed on the second half of the material from Step 2.

Step 4: Second Ammoniating Step

Ammonia was sparged into the combined batches from Step 3 until the pH was 5.5. The water added during this ammoniating step was 0.208 kg (0.458 pounds) and the final moisture was 12.6%

Step 5: Third Acidifying Step 0.146 kg (0.321 pounds) of 98% sulfuric acid was sprayed on half of the material from Step 4 and 0.123 kg (0.272 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.194 kg (0.427 pounds) and the moisture of the final product was 13.0%

Examples 3 to 12 were made with very similar procedures with some variation in the amount of water applied during the ammoniating step.

Example 3

Using the same milled and screened litter as Example 1, the litter was split into two equal sized batches and the same steps were followed as described for Example 1 noting the following parameters for each step.

Step 1: First Acidifying Step 0.0921 kg (0.230 pounds) of 98% sulfuric acid was sprayed on the first 0.68 kg (1.5 pounds) of litter and 0.0880 kg (0.194 pounds) of 98% sulfuric acid was sprayed on the second 0.68 kg (1.5 pounds) of litter.

Step 2: First Ammoniating Step

Ammonia was sparged into the combined batches from Step 1 until the pH was 6.0. The water added during the ammoniating step was 0.0373 kg (0.082 pounds) and the final moisture was 15.0%

Step 3: Second Acidifying Step 0.117 kg (0.256 pounds) of 98% sulfuric acid was sprayed on half of the material from Step 2 and 0.0868 kg (0.191 pounds) of 98% sulfuric acid was sprayed on the second half of the material from Step 2.

Step 4: Second Ammoniating Step

Ammonia was sparged into the combined batches from Step 3 until the pH was 5.5. The water added during this ammoniating step was 0.445 kg (0.980 pounds) and the final moisture was 11.4%

Step 5: Third Acidifying Step 0.0864 kg (0.190 pounds) of 98% sulfuric acid was sprayed on half of the material from Step 4 and 0.0973 kg (0.214 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.147 kg (0.324 pounds) and the moisture of the final product was 9.2%. The weight of product produced was 1.71 kg (3.76 pounds).

Example 4

Using the same milled and screened litter as Example 1, the litter was split into two equal sized batches and the same steps were followed as described for Example 1 noting the following parameters for each step.

Step 1: First Acidifying Step 0.117 kg (0.256 pounds) of 98% sulfuric acid was sprayed on the first 0.68 kg (1.5 pounds) of litter and 0.0936 kg (0.206 pounds) of 98% sulfuric acid was sprayed on the second 0.68 kg (1.5 pounds) of litter.

Step 2: First Ammoniating Step

Ammonia was sparged into the combined batches from Step 1 until the pH was 5.75. The water added during the ammoniating step was 0.0464 kg (0.102 pounds) and the final moisture was 13.9%

Step 3: Second Acidifying Step 0.0968 kg (0.213 pounds) of 98% sulfuric acid was sprayed on half of the material from Step 2 and 0.120 kg (0.263 pounds) of 98% sulfuric acid was sprayed on the second half of the material from Step 2.

Step 4: Second Ammoniating Step

Ammonia was sparged into the combined batches from Step 3 until the pH was 6.0. The water added during this ammoniating step was 0.0977 kg (0.215 pounds) and the final moisture was 11.3%

Step 5: Third Acidifying Step 0.112 kg (0.245 pounds) of 98% sulfuric acid was sprayed on half of the material from Step 4 and 0.0909 kg (0.200 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.143 kg (0.314 pounds) and the moisture of the final product was 11.2%. The weight of product produced was 1.91 kg (4.21 pounds)

Example 5

Using the same milled and screened litter as Example 1, the litter was split into two equal sized batches and the same steps were followed as described for Example 1 noting the following parameters for each step.

Step 1: First Acidifying Step 0.110 kg (0.243 pounds) of 98% sulfuric acid was sprayed on the first 0.68 kg (1.5 pounds) of litter and 0.0823 kg (0.181 pounds) of 98% sulfuric acid was sprayed on the second 0.68 kg (1.5 pounds) of litter.

Step 2: First Ammoniating Step

Ammonia was sparged into the combined batches from Step 1 until the pH was 6.0. No water was added during this ammoniating step. The final moisture was 15.4%

Step 3: Second Acidifying Step 0.0873 kg (0.192 pounds) of 98% sulfuric acid was sprayed on half of the material from Step 2 and 0.0809 kg (0.178 pounds) of 98% sulfuric acid was sprayed on the second half of the material from Step 2.

Step 4: Second Ammoniating Step

Ammonia was sparged into the combined batches from Step 3 until the pH was 6.0. The water added during this ammoniating step was 0.0595 kg (0.131 pounds) and the final moisture was 12.4%

Step 5: Third Acidifying Step 0.0868 kg (0.191 pounds) of 98% sulfuric acid was sprayed on half of the material from Step 4 and 0.0941 kg (0.207 pounds) of 98% sulfuric acid was sprayed on the second half of the material from Step 4.

Step 6: Third Ammoniating Step

Ammonia was sparged into the combined batches from Step 5 until the pH was 5.75. The water added during this ammoniating step was 0.0632 kg (0.139 pounds) and the moisture of the final product was 10.2%. The weight of product produced was 1.63 kg (3.59 pounds).

Example 6

Using the same milled and screened litter as Example 1, the litter was split into two equal sized batches and the same steps were followed as described for Example 1 noting the following parameters for each step.

Step 1: First Acidifying Step 0.101 kg (0.223 pounds) of 98% sulfuric acid was sprayed on the first 0.68 kg (1.5 pounds) of litter and 0.102 kg (0.0.224 pounds) of 98% sulfuric acid was sprayed on the second 0.68 kg (1.5 pounds) of litter.

Step 2: First Ammoniating Step

Ammonia was sparged into the combined batches from Step 1 until the pH was 7.0. No water was added during this ammoniating step. The final moisture was 14.3%

Step 3: Second Acidifying Step 0.103 kg (0.227 pounds) of 98% sulfuric acid was sprayed on half of the material from Step 2 and 0.102 kg (0.224 pounds) of 98% sulfuric acid was sprayed on the second half of the material from Step 2.

Step 4: Second Ammoniating Step

Ammonia was sparged into the combined batches from Step 3 until the pH was 5.5. The water added during this ammoniating step was 0.0955 kg (0.210 pounds) and the final moisture was 9.5%

Step 5: Third Acidifying Step 0.103 kg (0.227 pounds) of 98% sulfuric acid was sprayed on half of the material from Step 4 and 0.0986 kg (0.217 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.184 kg (0.405 pounds) and the moisture of the final product was 10.0%. The weight of the product was 1.88 kg (4.15 pounds).

Example 7

Using the same milled and screened litter as Example 1, the litter was split into two equal sized batches and the same steps were followed as described for Example 1 noting the following parameters for each step.

Step 1: First Acidifying Step 0.103 kg (0.226 pounds) of 98% sulfuric acid was sprayed on the first 0.68 kg (1.5 pounds) of litter and 0.100 kg (0.0.220 pounds) of 98% sulfuric acid was sprayed on the second 0.68 kg (1.5 pounds) of litter.

Step 2: First Ammoniating Step

Ammonia was sparged into the combined batches from Step 1 until the pH was 5.8. No water was added during this ammoniating step. The final moisture was 14.7%

Step 3: Second Acidifying Step 0.104 kg (0.228 pounds) of 98% sulfuric acid was sprayed on half of the material from Step 2 and 0.100 kg (0.220 pounds) of 98% sulfuric acid was sprayed on the second half of the material from Step 2.

Step 4: Second Ammoniating Step

Ammonia was sparged into the combined batches from Step 3 until the pH was 5.5. The water added during this ammoniating step was 0.154 kg (0.339 pounds) and the final moisture was 11.9%

Step 5: Third Acidifying Step 0.103 kg (0.226 pounds) of 98% sulfuric acid was sprayed on half of the material from Step 4 and 0.105 kg (0.230 pounds) of 98% sulfuric acid was sprayed on the second half of the material from Step 4.

Step 6: Third Ammoniating Step

Ammonia was sparged into the combined batches from Step 5 until the pH was 5.0. The water added during this ammoniating step was 0.156 kg (0.343 pounds) and the moisture of the final product was 12.2%. The weight of the product was 1.94 kg (4.27 pounds).

Example 8

Using the same milled and screened litter as Example 1, the litter was split into two equal sized batches and the same steps were followed as described for Example 1 noting the following parameters for each step.

Step 1: First Acidifying Step 0.102 kg (0.224 pounds) of 98% sulfuric acid was sprayed on the first 0.68 kg (1.5 pounds) of litter and 0.104 kg (0.0.229 pounds) of 98% sulfuric acid was sprayed on the second 0.68 kg (1.5 pounds) of litter.

Step 2: First Ammoniating Step

Ammonia was sparged into the combined batches from Step 1 until the pH was 7.5. No water was added during this ammoniating step. The final moisture was 12.7%

Step 3: Second Acidifying Step 0.0968 kg (0.213 pounds) of 98% sulfuric acid was sprayed on half of the material from Step 2 and 0.102 kg (0.224 pounds) of 98% sulfuric acid was sprayed on the second half of the material from Step 2.

Step 4: Second Ammoniating Step

Ammonia was sparged into the combined batches from Step 3 until the pH was 6.0. The water added during this ammoniating step was 0.170 kg (0.375 pounds) and the final moisture was 11.3%

Step 5: Third Acidifying Step 0.105 kg (0.231 pounds) of 98% sulfuric acid was sprayed on half of the material from Step 4 and 0.101 kg (0.223 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.141 kg (0.310 pounds) and the moisture of the final product was 11.2%. The weight of the product was 1.90 kg (4.18 pounds).

Example 9

Using the same milled and screened litter as Example 1, the litter was split into two equal sized batches and the same steps were followed as described for Example 1 noting the following parameters for each step.

Step 1: First Acidifying Step 0.102 kg (0.224 pounds) of 98% sulfuric acid was sprayed on the first 0.68 kg (1.5 pounds) of litter and 0.102 kg (0.0.225 pounds) of 98% sulfuric acid was sprayed on the second 0.68 kg (1.5 pounds) of litter.

Step 2: First Ammoniating Step

Ammonia was sparged into the combined batches from Step 1 until the pH was 6.5. No water was added during this ammoniating step. The final moisture was 13.8%

Step 3: Second Acidifying Step 0.103 kg (0.220 pounds) of 98% sulfuric acid was sprayed on half of the material from Step 2 and 0.118 kg (0.257 pounds) of 98% sulfuric acid was sprayed on the second half of the material from Step 2.

Step 4: Second Ammoniating Step

Ammonia was sparged into the combined batches from Step 3 until the pH was 5.5. The water added during this ammoniating step was 0.155 kg (0.341 pounds) and the final moisture was 14.3%

Step 5: Third Acidifying Step 0.104 kg (0.229 pounds) of 98% sulfuric acid was sprayed on half of the material from Step 4 and 0.101 kg (0.222 pounds) of 98% sulfuric acid was sprayed on the second half of the material from Step 4.

Step 6: Third Ammoniating Step

Ammonia was sparged into the combined batches from Step 5 until the pH was 5.5. The water added during this ammoniating step was 0.0868 kg (0.191 pounds) and the moisture of the final product was 11.1%. The weight of the product was 2.07 kg (4.56 pounds).

The product from the last ammoniating step was analyzed for size using a CAMSIZER®. This analysis showed that 88.9% of the product ranged in size between 1 mm and 3.35 mm (see Table 2 below). And the Mean Value Symm3 was 0.882 which shows that the product was round as compared to a perfectly spherical number of 1.0. It was also noticed by observation that this product was not as smooth or as round as the products of Example 1 and Example 2.

TABLE 2

Results of CAMSIZER ® measurements of Example 9

| Screen Size (mm) | ASTM Screen Size | Weight Percent Retained on Screen | Weight Percent Passing |
|---|---|---|---|
| >4.00 | >#5 | 1.69 | 100 |
| 3.35 | #6 | 3.73 | 98.31 |

TABLE 2-continued

Results of CAMSIZER ® measurements of Example 9

| Screen Size (mm) | ASTM Screen Size | Weight Percent Retained on Screen | Weight Percent Passing |
|---|---|---|---|
| 2.80 | #7 | 7.05 | 94.58 |
| 2.36 | #8 | 10.79 | 87.53 |
| 2.00 | #10 | 14.16 | 76.74 |
| 1.70 | #12 | 15.68 | 62.58 |
| 1.40 | #14 | 17.86 | 46.90 |
| 1.18 | #16 | 12.14 | 29.04 |
| 1.00 | #18 | 7.46 | 16.90 |
| 0.85 | #20 | 4.12 | 9.44 |
| 0.71 | #25 | 2.28 | 5.32 |
| <0.71 | | 3.04 | 3.04 |

Example 10

Poultry litter from a poultry house in Russellville, Ala. was milled to pass a 4.76 mm (3/16 inch) screen. This poultry litter was de-caked every six weeks and then a total cleanout after a year which is when this litter was collected. The moisture of the litter was 27%. The procedures for the acidifying steps were done like described in Example 1 with the following noted differences.

Step 1: Acidifying Step

A SS Unijet 6500033 spray nozzle was used for applying the sulfuric acid which streamed instead of spraying. 0.382 kg (0.84 pounds) of 98% sulfuric acid was streamed onto 0.68 kg (1.5 pounds) of litter.

Step 2: Ammoniating Step

Ammonia was sparged into the small batch from Step 1 until the apparent pH was 6.0. No water was added during this ammoniating step. Due to the acid being streamed into the material instead of sprayed, large agglomerates formed and the inside of these granules had a very low pH showing incompleteness of the reaction of sulfuric acid with the ammonia. The agglomerates were too large because of excessive liquid attractions between particles.

Example 11

The same prepared litter used for Example 10 was used for this example. The procedures for the acidifying steps were done like described in Example 1 with the following noted differences.

Step 1: Acidifying Step

A SS Unijet 11001 spray nozzle was used for applying the sulfuric acid which streamed instead of spraying. 0.126 kg (0.278 pounds) of 98% sulfuric acid was streamed onto 0.68 kg (1.5 pounds) of litter.

Step 2: Ammoniating Step

Ammonia was sparged into the small batch from Step 1 until the apparent pH was 6.0. No water was added during this ammoniating step. Large agglomerates formed and the inside of these granules had a very low pH showing incompleteness of the reaction of sulfuric acid with the ammonia.

Step 3: Acidifying Step 0.165 kg (0.364 pounds) of 98% sulfuric acid was streamed onto 0.68 kg (1.5 pounds) of litter.

Step 2: Ammoniating Step

Ammonia was sparged into the small batch from Step 3 and the pH would not raise to the targeted pH of 5.0-6.0. No water was added during this ammoniating step. There were a significant number of large agglomerates.

Example 12

The same prepared litter used for Example 10 was used for this example. The procedures for the acidifying steps were done like described in Example 1 with the following noted differences.

Step 1: First Acidifying Step

A SS Unijet 11001 spray nozzle was used for applying the sulfuric acid and this produced a good spray pattern. 0.135 kg (0.297 pounds) of 98% sulfuric acid was sprayed on the first 0.68 kg (1.5 pounds) of litter and 0.108 kg (0.0.238 pounds) of 98% sulfuric acid was sprayed on a second 0.68 kg (1.5 pounds) of litter.

Step 2: First Ammoniating Step

Ammonia was sparged into the combined batches from Step 1 until the apparent pH was 7.0. No water was added during this ammoniating step. The final moisture was 19.3%.

Step 3: Second Acidifying Step 0.085 kg (0.187 pounds) of 98% sulfuric acid was sprayed on half of the material from Step 2 and 0.0986 kg (0.217 pounds) of 98% sulfuric acid was sprayed on the second half of the material from Step 2.

Step 4: Second Ammoniating Step

Ammonia was sparged into the combined batches from Step 3 until the apparent pH was 6.5. No water was added during this ammoniating step and the final moisture was 13.4%

Step 5: Third Acidifying Step 0.0909 kg (0.200 pounds) of 98% sulfuric acid was sprayed on half of the material from Step 4 and 0.101 kg (0.222 pounds) of 98% sulfuric acid was sprayed on the second half of the material from Step 4.

Step 6: Third Ammoniating Step

Ammonia was sparged into the combined batches from Step 5 until the actual pH was 6.5. The water added during this ammoniating step was 0.137 kg (0.301 pounds) and the moisture of the final product was 13.8%.

The products from Examples 5, 6, and 7 were combined together and run through a California Pellet mill with a 6.35 mm (¼ inch) die installed. The resulting product was a hard pellet about 6.35 mm in diameter and 9.25 mm long. This product could be crumbled to a smaller size if desired.

Selected products were tested for carbon content and nutrient content. The results of these tests are shown in Table 3 below.

TABLE 3

Product Nutrient Analysis of Examples 1, 2, 3, 4 and Pelletized Product

| Nutrient | Example #1 | Example #2 | Example #3 | Example #4 | Pelletized Product of Examples 5, 6, & 7 |
|---|---|---|---|---|---|
| % N | 10.4 | 10.2 | 9.08 | 9.45 | 9.62 |
| % $P_2O_5$ | 2.01 | 1.79 | 2.13 | 2.22 | 2.35 |
| % $K_2O$ | 1.43 | 1.39 | 1.72 | 1.60 | 1.80 |
| % S | 11.47 | 11.23 | 10.17 | 9.55 | 10.20 |
| % Zn | 0.024 | 0.360 | 0.026 | 0.034 | 0.028 |
| % Mg | 0.332 | 0.309 | 0.358 | 0.360 | 0.383 |
| % Ca | 1.55 | 1.32 | 1.59 | 1.80 | 1.75 |
| % Fe | 0.116 | 0.107 | 0.112 | 0.161 | 0.182 |
| % Al | 0.185 | 0.173 | 0.167 | 0.181 | 0.215 |
| % Mn | 0.026 | 0.024 | 0.028 | 0.027 | 0.031 |
| % Mo | 0 | 0.002 | 0 | 0.002 | 0.002 |
| % B | 0.001 | 0.001 | 0.002 | 0.002 | 0.002 |

TABLE 3-continued

Product Nutrient Analysis of Examples 1, 2, 3, 4 and Pelletized Product

| Nutrient | Example #1 | Example #2 | Example #3 | Example #4 | Pelletized Product of Examples 5, 6, & 7 |
|---|---|---|---|---|---|
| % Cu | 0.008 | 0.007 | 0.009 | 0.010 | 0.011 |
| % C | 15.8 | 14.3 | *NM | *NM | *NM |

*NM = not measured

Example 13

The inventive fertilizer was tested on turf grass and visually inspected to see how it performed in comparison to plots fertilized with other lawn fertilizers. For this example, plots that had Bermuda grass growing in them were marked off in a level field with stakes and string. Each plot was 1.22 m by 2.44 m (4 feet by 8 feet). Each plot had a buffer zone of 30.5 cm (1 foot) between it and any adjoining plot. The fertilizers used for the plots were Scotts® Green Max Lawn Food (SG), see Table 4 for nutrient content; Meherrin Lawn and Garden Plant Food (MH), see Table 6 for nutrient content; and the inventive fertilizer of Example 3 (E), see Table 3 for nutrient content. A baseline plot was also created for and no fertilizer was applied.

TABLE 4

Nutrient Content of SG

| Total N | 27% |
| Available Phosphate ($P_2O_5$) | 0% |
| Soluble Potash ($K_2O$) | 2% |
| Iron (Fe) | 5% |
| Sulfur (Mn) | 10% |

Nutrients derived from: Ammonium Sulfate, Methyleneureas, Urea, Potassium Sulfate, and Iron Sucrate; Contains 6.38% slowly available nitrogen from methyleneureas.

The weight of fertilizer placed on each plot is listed below:

SG=48.4
MH=163.4
E=145.2

TABLE 5

Nutrients applied to each plot for Example 13

| Test Label | Weight of N (g) | Weight of $P_2O_5$ (g) | Weight of $K_2O$ (g) |
|---|---|---|---|
| SG | 13.1 | 0 | 0.0968 |
| MH | 13.1 | 13.1 | 13.1 |
| E | 13.1 | 3.05 | 2.47 |
| BL | 0 | 0 | 0 |

Observations

Because the weight of the SG required to balance the nitrogen application of the inventive fertilizer was much lower, it was difficult to spread the fertilizer evenly over the whole plot. Therefore, there were spots in the turf grass of that plot that were greener than in other plots.

The plots receiving the inventive fertilizer, E, appeared to green as quickly as the SG plots but the greening was evenly distributed over the whole plot.

All of the plots receiving fertilizers were greener than the BL plot.

The green for the plots that received the inventive fertilizer lasted as long as the green for the SG plot and both of these lasted longer than the MH plot.

CONCLUSIONS FROM EXAMPLE 13

The inventive fertilizer performed as well as the other fertilizers when used on turf grass without any additional phosphate or potassium.

Example 14

To test the effects of the inventive fertilizer product on plant growth, cotton was grown in a greenhouse using 18.9 L (5 gallon) containers. Each container was prepared with 30 kg of local top soil that had been sieved to remove large rocks and other debris. Two cotton seeds were planted in each container and fertilizer was applied to each container. The baseline test (BL) was given no fertilizer. The E+ tests were given the inventive fertilizer and additional phosphate and potassium in the second fertilizer application at levels to match the inorganic phosphate and potassium in the test fertilizers purchased for comparison (MH and HY). The cotton seeds planted in each container were weighed to fall within the range of 0.0895 g to 0.1035 g. Each fertilizer application and the baseline were tested in triplicate. After the cotton plants sprouted, the containers were thinned to one plant per container.

The fertilizers used for Example 14 were Meherrin Lawn and Garden Plant Food (MH), Hi-Yield Growers Choice (HY), and Inventive Fertilizer Example #3 (with nutrient levels shown in Table 3 above). The nutrient levels of the MH and HY are listed in Table 6 and Table 7 below. The tests given the inventive fertilizer were noted as E (given no extra phosphate or potassium) and E+ (given additional phosphate and potassium to balance the amount of each given per container for the MH and the HY fertilizers.

TABLE 6

Nutrient Content of MH

| Total N | 8.00% |
| Available Phosphate (P$_2$O$_5$) | 8.00% |
| Soluble Potash (K$_2$O) | 8.00% |

Nutrients derived from: Ammonium Sulfate, Muriate of Potash, Diammonium Phosphate, Urea

TABLE 7

Nutrient Content of HY

| Total N | 12% |
| Available Phosphate (P$_2$O$_5$) | 6% |
| Soluble Potash (K$_2$O) | 6% |
| Boron (B) | 0.02% |
| Copper (Cu) | 0.05% |
| Iron (Fe) | 0.10% |
| Manganese (Mn) | 0.05% |
| Zinc (Zn) | 0.05% |

Nutrients derived from: Nitrate of Potash, Ammoniated Phosphate, Urea, Polymer Coated Sulfur Coated Urea, Sodium Borate, Copper Sulfate, Ferrous Sulfate, Manganese Sulfate, Zinc Sulfate, 6.8% slowly available nitrogen from Polymer Coated Sulfur Coated Urea Table 8 shows how much fertilizer and other nutrients were given to each container for each test and Table 8b shows how much of each nutrient was given to each container before planting.

TABLE 8

Amount of Fertilizer Applied per Container before planting for Example 14.

| Test Label | Weight of Fertilizer Applied (g) | Weight of Urea (46-0-0) Applied to Balance Nitrogen (g) | Weight of Triple Super Phosphate (0-45-0) Applied to Balance Phosphate (g) | Weight of Potassium Chloride (0-0-60) Applied to Balance K$_2$O (g) |
| --- | --- | --- | --- | --- |
| MH | 1.53 | 0.27 | 0 | 0 |
| HY | 2.00 | 0 | 0 | 0 |
| E | 2.73 | 0 | 0 | 0 |
| E+ | 2.73 | 0 | 0.14 | 0.14 |
| *BL | 0 | 0 | 0 | 0 |

TABLE 8b

Weight of Nutrients Applied per Container for the Weights Shown in Table 8 Above

| Test Label | Weight of N (g) | Weight of P$_2$O$_5$ (g) | Weight of K$_2$O (g) |
| --- | --- | --- | --- |
| MH | 0.24 | 0.12 | 0.12 |
| HY | 0.24 | 0.12 | 0.12 |
| E | 0.24 | 0.057 | 0.046 |
| E+ | 0.24 | 0.12 | 0.12 |
| *BL | 0 | 0 | 0 |

The containers were planted on Jun. 26, 2019. The containers were watered regularly with equal weights amounts of rain water.

Additional fertilizer was applied to each container on Aug. 23, 2019 in the amounts shown in Table 9. Table 9b shows the amount of each nutrient was given to each container on Aug. 23, 2019.

TABLE 9

Amount of Fertilizer Applied per Container given to Example 14 on 8/23/19

| Test Label | Weight of Fertilizer Applied (g) | Weight of Urea Applied to Balance Nitrogen (g) | Weight of Triple Super Phosphate Applied to Balance Phosphate (g) | Weight of Potassium Chloride Applied to Balance K$_2$O (g) |
| --- | --- | --- | --- | --- |
| MH | 3.22 | 0.56 | 0 | 0 |
| HY | 4.29 | 0 | 0 | 0 |
| E | 5.83 | 0 | 0 | 0 |
| E+ | 5.83 | 0 | 0.57 | 0.43 |
| *BL | 0 | 0 | 0 | 0 |

TABLE 9b

Weight of Nutrients Applied per Container for the Weights Shown in Table 9 Above

| Test Label | Weight of N (g) | Weight of P$_2$O$_5$ (g) | Weight of K$_2$O (g) |
| --- | --- | --- | --- |
| MH | 0.52 | 0.28 | 0.28 |
| HY | 0.51 | 0.26 | 0.26 |

TABLE 9b-continued

Weight of Nutrients Applied per Container for
the Weights Shown in Table 9 Above

| Test Label | Weight of N (g) | Weight of $P_2O_5$ (g) | Weight of $K_2O$ (g) |
|---|---|---|---|
| E | 0.52 | 0.12 | 0.099 |
| E+ | 0.52 | 0.37 | 0.36 |
| BL | 0 | 0 | 0 |

Due to low light and the late planting of the cotton, the plants began to slow their growth and pests became a problem in the greenhouse. On Dec. 9, 2019, all of the plants were cut at the surface of the soil and dried in a 50° C. oven for 2 days and then weighed. The resulting averages of the weights are provided in Table 10.

TABLE 10

Average Total Dry Weight of Cotton Plants for Example 14

| Test Label | Average Dry Weight of Plants (g) | % Difference Between Average Dry Weight and Average Baseline Weight |
|---|---|---|
| MH | 37.0 | +27.6% |
| HY | 37.4 | +29.0% |
| E | 32.3 | +11.4% |
| E+ | 38.2 | +31.8% |
| BL | 29.0 | 0% |

CONCLUSIONS FOR EXAMPLE 14

The inventive fertilizer improved plant growth.

The cotton plants given the inventive fertilizer with phosphate and potassium levels to match the inorganic fertilizers produced healthier plants with more plant growth than any of the other tests. Additional phosphate and potassium needed by a crop can be incorporated into the inventive fertilizer by the inventive process.

The plants grown with the inventive fertilizer produced up to a 32% increase in plant mass as compared to the plants grown without any fertilizer.

The invention claimed is:

1. A method for producing a poultry litter-based fertilizer having an enhanced nitrogen level comprising:
   a) supplying poultry litter to a rotating rotary drum;
   b) adding an acid and/or a source of acid to the rotating rotary drum, wherein the source of acid forms acid in the rotating rotary drum, and the acid in the rotating rotary drum reacts with the poultry litter to form heat and an acidified mixture;
   c) adding water and at least one of ammonia or a source of ammonia to the rotating rotary drum, wherein the source of ammonia forms ammonia in the rotating rotary drum, and the ammonia in the rotating rotary drum reacts with the acidified mixture to produce heat and an ammoniated mixture containing an ammonium salt;
   d) drying and cooling the ammoniated mixture by evaporation of water to form a dried, cooled product in a free-flowing semi-solid or solid form;
   e) repeating steps b) through d) until a desired nitrogen content is reached in the dried, cooled product;
   f) adjusting a pH in at least one step b) to destroy pathogens, weed seeds, drugs, hormones, and/or antibiotics present in the poultry litter; and
   g) final drying and cooling of the dried, cooled product to form the poultry litter-based fertilizer having an enhanced nitrogen level greater than 6% nitrogen by weight based on the total weight of the poultry litter-based fertilizer compared to a poultry litter-based fertilizer produced by only running steps b) and c) once, wherein the ammonium salt comprises ammonium sulfate and the poultry litter-based fertilizer comprising at least 30% ammonium sulfate by weight.

2. The method according to claim 1, wherein in steps c) and d) an ammonium salt layer is formed on a surface of the product, and wherein the water added in a subsequent step c) is added in an amount to break the ammonium salt layer and allow ammonia to enter the product.

3. The method according to claim 1, wherein in step c) the water is added in an amount to prevent an ammonium salt layer from forming on the product.

4. The method according to claim 1, further comprising h) collecting a waste stream from any step or wash down water, wherein at least a portion of the waste stream is added to any of the steps b), c) and/or d).

5. The method according to claim 1, wherein no heat generated by burning fossil fuels is added to the method.

6. The method according to claim 1, wherein the acid and/or source of acid in step b) comprises one or more selected from the group of sulfuric acid ($H_2SO_4$), sulfurous acid ($H_2SO_3$), nitric acid ($HNO_3$), nitrous acid ($HNO_2$), phosphoric acid ($H_3PO_4$), phosphorous acid ($H_3PO_3$), hypophosphorus acid ($H_3PO_2$), pyrophosphoric acid $H_4P_2O_7$, triphosphoric acid ($H_5P_3O_{10}$), trimetaphosphoric acid ($H_3P_3O_9$), and hypophosphoric acid ($H_4P_2O_6$), sulfur trioxide, and/or oleum.

7. The method according to claim 1, wherein the acid and/or source of acid in step b) is at least one of sulfuric acid, sulfur trioxide, or oleum and partially carbonizes the poultry litter and/or converts lignocellulose in the poultry litter to forms of carbon more readily available to soil organisms and/or plants.

8. The method according to claim 1, further comprising:
   adding at least one secondary nutrient and/or micronutrient, wherein at least one secondary nutrient and/or micronutrient is subjected to at least one acidifying step b);
   wherein the at least one secondary nutrient and/or micronutrient comprises at least one metal, metal oxide or a mixture of a metal and a metal oxide; wherein the metal comprises at least one metal chosen from the group of zinc, iron, copper, magnesium, manganese, and/or nickel; and wherein the metal oxide comprises at least one metal oxide chosen from the group of zinc oxide, magnesium oxide, manganese oxides, copper oxides, and/or iron oxides;
   and/or wherein the at least one secondary nutrient and/or micronutrient comprises at least one of lime, magnesium chloride, magnesium nitrate, sodium nitrate, sodium chloride, zinc chloride, zinc nitrate, copper chloride, copper nitrate, potassium chloride, potassium nitrate, potassium sulfate, triple super phosphate, and/or super phosphate;
   and/or wherein the at least one secondary nutrient and/or micronutrient comprises at least one of potassium hydroxide, zinc hydroxide, magnesium hydroxide, manganese hydroxide.

9. The method according to claim 8, wherein the at least one secondary nutrient and/or micronutrient forms a sulfate.

10. The method according to claim 1, wherein the method is a closed-system and mainly water vapor and the poultry litter-based fertilizer are expelled from the method with any waste streams being recycled into any of the steps.

11. The method according to claim 1, wherein the poultry litter-based fertilizer contains % N levels greater than 8 wt. %; % $P_2O_5$ levels of less than 2 wt. %; % $K_2O$ levels of more than 2 wt. %; and % S levels of greater than 5 wt %.

12. The method according to claim 1, wherein the acidified mixture in step b) comprises less than 40 wt % water.

13. The method according to claim 1, wherein the heat generated in steps b) and/or c) raises a temperature of the ammoniated mixture in step c) to greater than 90° C.

14. The method according to claim 1, wherein in the step d) the ammoniated mixture is cooled to a temperature of less than 80° C.

15. The method according to claim 1, wherein the poultry litter-based fertilizer comprises less than 12 wt % water.

16. The method according to claim 1,
wherein the acid and/or the source of acid is added in the rotating rotary drum in an amount to provide the acidified mixture with a pH of less than 1, and wherein the ammonia and/or the source of ammonia is added to the rotating rotary drum in an amount to provide the ammoniated mixture with a pH of at least 5.

17. The method according to claim 1, wherein the ammonia and/or the source of ammonia is added to the rotating rotary drum in an amount to provide the ammoniated mixture with a pH of at least 5.

18. The method according to claim 1, wherein the rotating rotary drum comprises a first chamber, a second chamber and a third chamber in communication with each other, the step b) is conducted in the first chamber, the step c) is conducted in the second chamber and the step d) is conducted in the third chamber, wherein the method is operated in continuous manner with the mixtures flowing continuously from the first chamber, to the second chamber and then to the third chamber.

19. The method according to claim 18, further comprising providing a continuous air flow through the first chamber, the second chamber and the third chamber wherein air flow exiting the rotating rotary drum is sent to a scrubber to form a waste stream that is fed back to any of the first chamber, the second chamber and/or the third chamber.

20. The method according to claim 1, wherein the rotating rotary drum is rotated so that the litter being acidified is tumbled in the first chamber, the acidified mixture being ammoniated is tumbled in the second chamber, and the ammoniated mixture being dried and cooled is raised and then dropped through the third chamber.

21. The method according to claim 20, wherein water is sprayed in the first chamber, the second chamber and the third chamber.

22. The method according to claim 20, further comprising providing a constant air flow through the dropping mixtures in the third chamber.

23. The method according to claim 18, wherein in step b) the acid and/or the source of acid is sprayed on the litter tumbling against the first chamber of the rotating rotary drum, in step c) the water is sprayed on the acidified mixture tumbling against the second chamber of the rotating rotary drum, and the ammonia and/or source of ammonia is injected into the tumbling acidified mixture, and in step d) the drying and cooling is increased by raising and dropping the ammoniated mixture in the third chamber of the rotating rotary drum.

24. The method according to claim 1, wherein the poultry litter-based fertilizer comprises at least 8% nitrogen by weight.

25. The method according to claim 1, wherein the poultry litter comprising at least 10% bedding material by weight.

26. The method according to claim 1, wherein the poultry litter-based fertilizer comprising at least 4.5% by weight of other nutrients, secondary nutrients, and micronutrients wherein at least 0.5% by weight of the nutrients, secondary nutrients, and micronutrients are from inorganic sources.

27. The method according to claim 1, wherein the poultry litter-based fertilizer is in a form of a granule having a granule size of 1 mm to 3 mm and wherein the crush strength of the granule is at least 4.45 Newtons.

28. The method according to claim 1, further comprising repeating steps b) through d) at least one more time.

* * * * *